(12) United States Patent
Kim et al.

(10) Patent No.: US 11,301,094 B2
(45) Date of Patent: Apr. 12, 2022

(54) DISPLAY APPARATUS AND MANUFACTURING METHOD THEREOF

(71) Applicant: Samsung Display Co., Ltd., Yongin-si (KR)

(72) Inventors: Minsoo Kim, Seoul (KR); Mugyeom Kim, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 844 days.

(21) Appl. No.: 15/663,197

(22) Filed: Jul. 28, 2017

(65) Prior Publication Data

US 2018/0136766 A1    May 17, 2018

(30) Foreign Application Priority Data

Nov. 15, 2016  (KR) .................. 10-2016-0152194

(51) Int. Cl.
*G02B 5/30* (2006.01)
*G06F 3/044* (2006.01)
(Continued)

(52) U.S. Cl.
CPC .............. *G06F 3/0443* (2019.05); *G02B 5/30* (2013.01); *G06F 3/041* (2013.01); *G06F 3/0412* (2013.01);
(Continued)

(58) Field of Classification Search
CPC ........ G06F 3/0412; G06F 3/041; G06F 3/044; G06F 2203/04103; G06F 2203/04112;
(Continued)

(56) References Cited

U.S. PATENT DOCUMENTS 9,778,498 B2 * 10/2017 Lee ...................... G06F 1/1652
9,804,312 B2 * 10/2017 Yang ................... H01L 51/5284
(Continued)

FOREIGN PATENT DOCUMENTS

CN    101354458    1/2009
CN    103309503    9/2013
(Continued)

OTHER PUBLICATIONS

Extended European Search Report dated May 2, 2018, in European Patent Application No. 17201729.5.
(Continued)

*Primary Examiner* — Temesghen Ghebretinsae
*Assistant Examiner* — Karin Kiyabu
(74) *Attorney, Agent, or Firm* — H.C. Park & Associates, PLC

(57) ABSTRACT

A display apparatus includes a display panel and a window member. The display panel includes pixels configured to display an image. The window member is disposed on the display panel. The window member includes a window substrate, polarization patterns, first electrodes, and second electrodes. The window substrate includes a first surface and a second surface. The first surface includes a first groove defined therein. The second surface faces the first surface. The second surface includes a second groove defined therein. The polarization patterns are disposed in the first groove. The first electrodes are disposed in the second groove. The first electrodes extend in a first direction. The second electrodes are disposed on the second surface and the horizontal electrodes. The second electrodes extend in a second direction crossing the first direction. The second electrodes are connected to the first electrodes.

19 Claims, 24 Drawing Sheets

(51) Int. Cl.
*G06F 3/041* (2006.01)
*G06K 9/00* (2022.01)

(52) U.S. Cl.
CPC ....... *G06F 3/0446* (2019.05); *G06K 9/00013* (2013.01); *G06F 2203/04103* (2013.01); *G06F 2203/04112* (2013.01); *G06K 9/0002* (2013.01)

(58) Field of Classification Search
CPC . G06F 3/0443; G06F 3/0446; G06K 9/00013; G06K 9/0002; G02B 5/30; B32B 3/30; B32B 2457/208; H01L 27/3227; H01L 27/323; H01L 51/524; H01L 51/5281
See application file for complete search history.

(56) References Cited

U.S. PATENT DOCUMENTS

| | | | |
|---|---|---|---|
| 10,421,157 B2 | 9/2019 | Chan et al. | |
| 10,956,708 B2* | 3/2021 | Jang | G06K 9/0008 |
| 10,983,652 B2* | 4/2021 | Jung | G06F 1/1684 |
| 2005/0100830 A1 | 5/2005 | Xu et al. | |
| 2009/0027773 A1 | 1/2009 | Kawakami | |
| 2014/0158507 A1 | 6/2014 | Park et al. | |
| 2014/0184933 A1* | 7/2014 | Park | G06F 1/169 349/12 |
| 2014/0293162 A1* | 10/2014 | Park | G06F 1/1626 349/12 |
| 2014/0333855 A1* | 11/2014 | Park | G06F 3/045 349/12 |
| 2015/0055057 A1* | 2/2015 | Huang | G02F 1/133528 349/62 |
| 2015/0060252 A1* | 3/2015 | Wang | G06F 3/0412 200/5 R |
| 2015/0070605 A1 | 3/2015 | Liu et al. | |
| 2015/0189136 A1 | 7/2015 | Chung et al. | |
| 2015/0277622 A1* | 10/2015 | Hsu | H05K 3/4673 345/174 |
| 2015/0310251 A1 | 10/2015 | Wyrwas et al. | |
| 2016/0147346 A1 | 5/2016 | Lee et al. | |
| 2016/0179234 A1* | 6/2016 | Dan | G06F 3/041 345/174 |
| 2016/0299597 A1 | 10/2016 | Yoo et al. | |
| 2016/0355705 A1* | 12/2016 | Kawano | B32B 15/08 |
| 2017/0052639 A1 | 2/2017 | Kobayashi | |
| 2017/0220158 A1* | 8/2017 | Peng | G06F 3/047 |
| 2017/0220182 A1* | 8/2017 | Schwartz | G06F 3/04164 |
| 2017/0372123 A1* | 12/2017 | Kim | G06F 3/044 |
| 2018/0113548 A1* | 4/2018 | Lee | G06F 3/04164 |

FOREIGN PATENT DOCUMENTS

| | | |
|---|---|---|
| CN | 104951120 | 9/2015 |
| CN | 105468201 | 4/2016 |
| EP | 3 062 202 | 8/2016 |
| KR | 10-2009-0012115 | 2/2009 |
| KR | 10-2014-0132264 | 11/2014 |
| KR | 10-1495630 | 2/2015 |
| KR | 10-1700998 | 1/2017 |
| TW | 201439873 | 10/2014 |
| WO | 2015129308 | 9/2015 |
| WO | 2016/002279 | 1/2016 |

OTHER PUBLICATIONS

Notice of Allowance dated May 24, 2019, in European Patent Application No. 17201729.5.

Office Action dated Jun. 30, 2021, in Taiwanese Patent Application No. 106139538.

* cited by examiner

FIG. 7
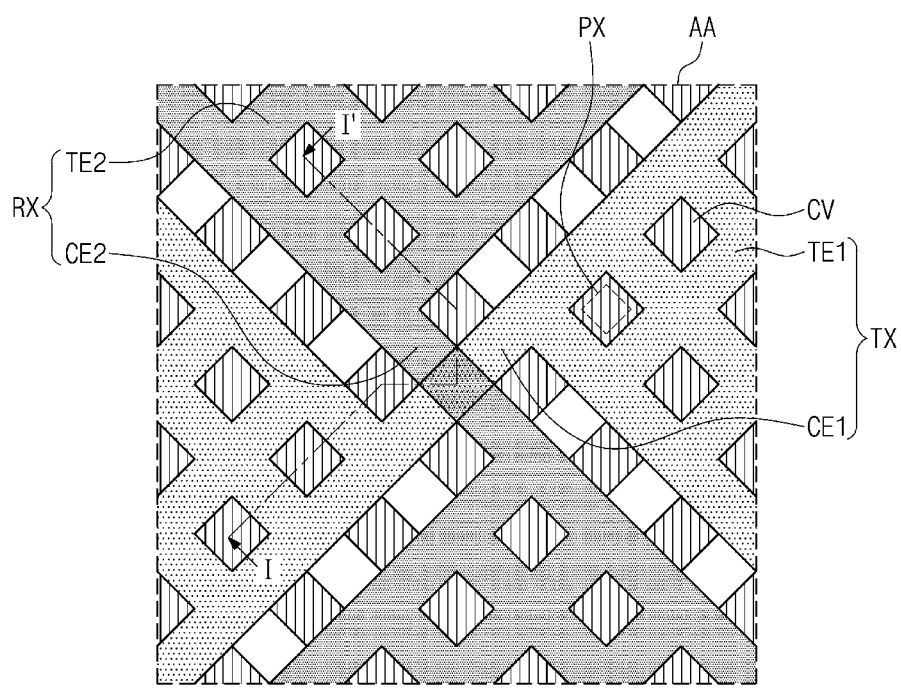
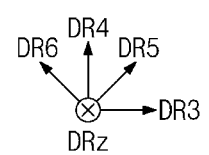

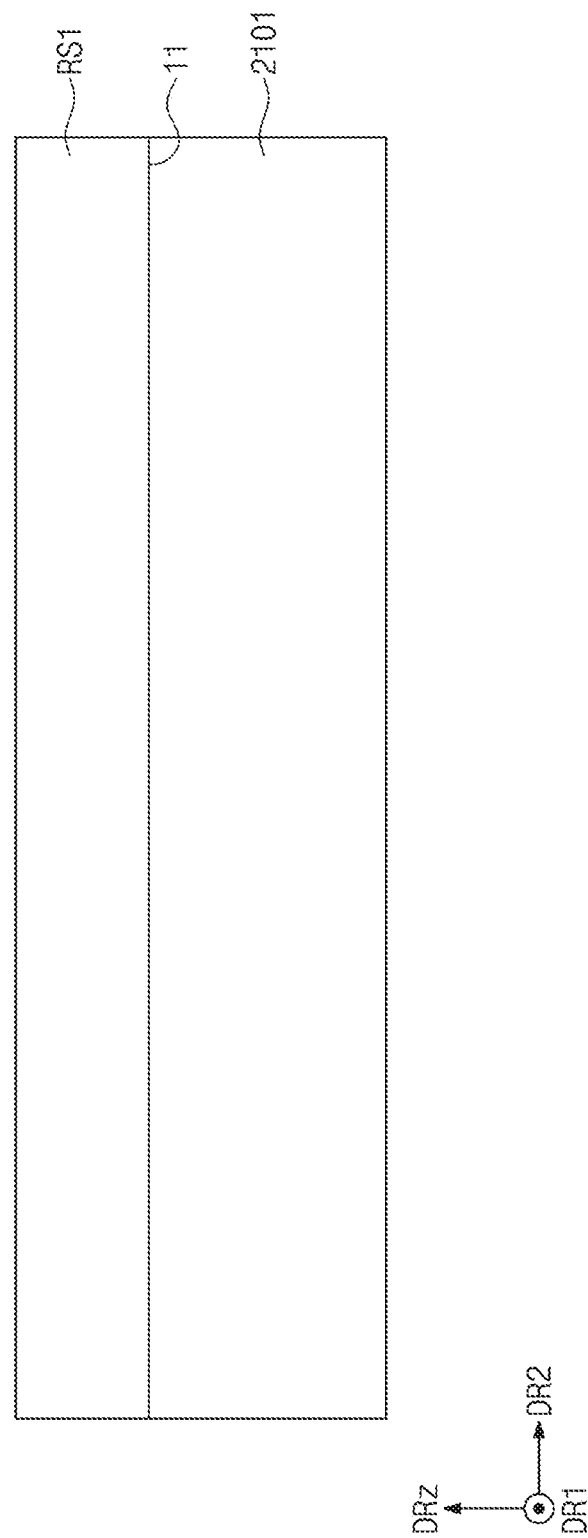

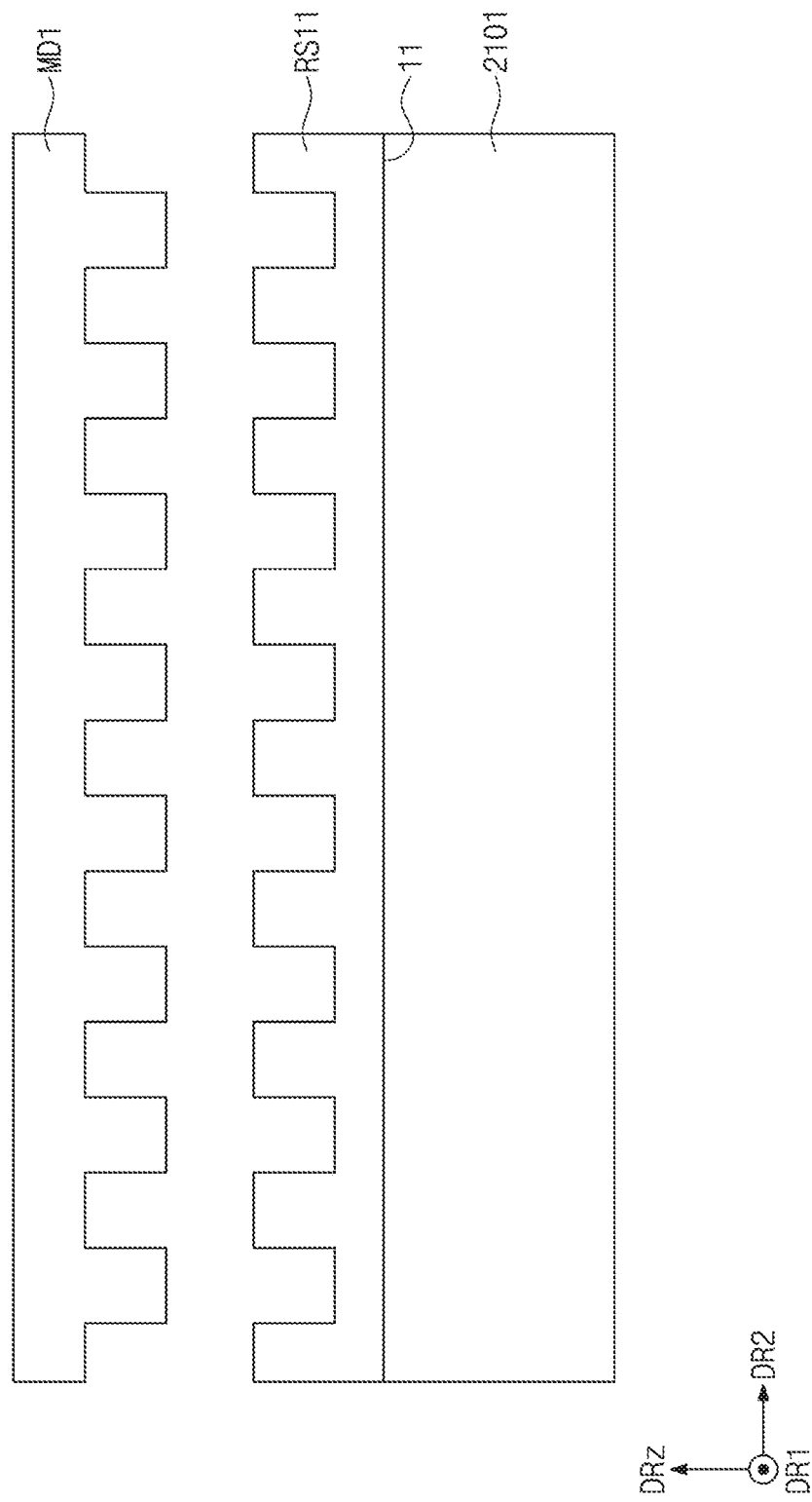

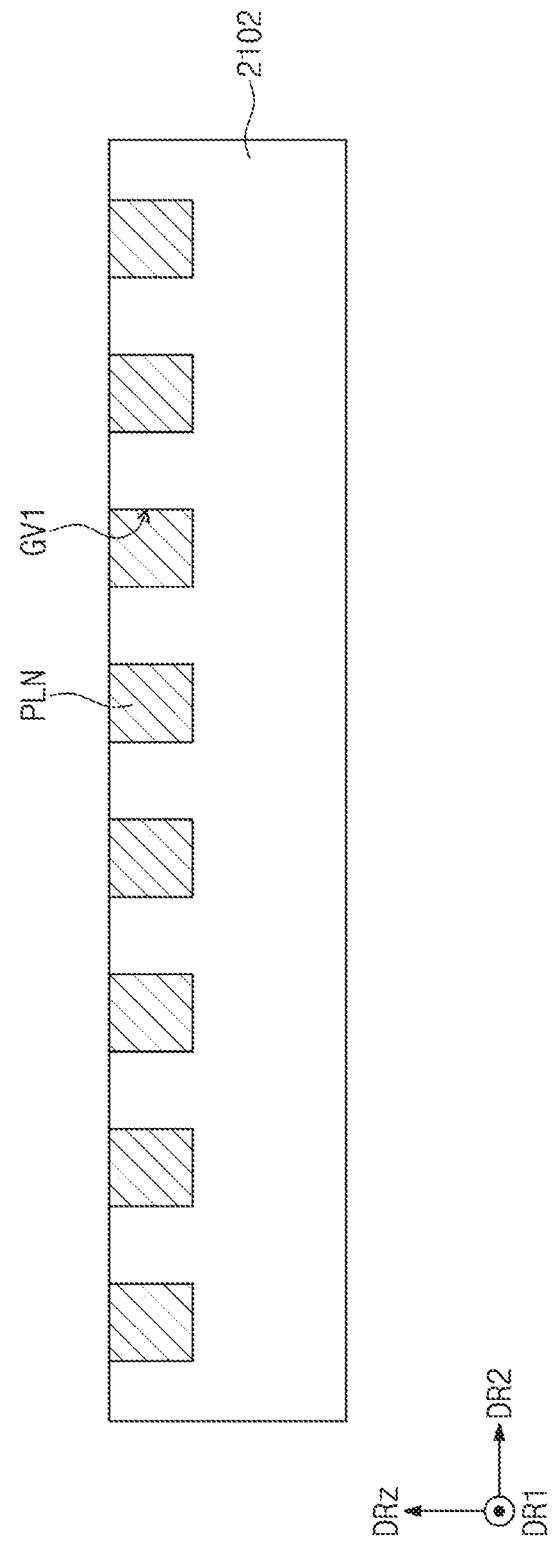

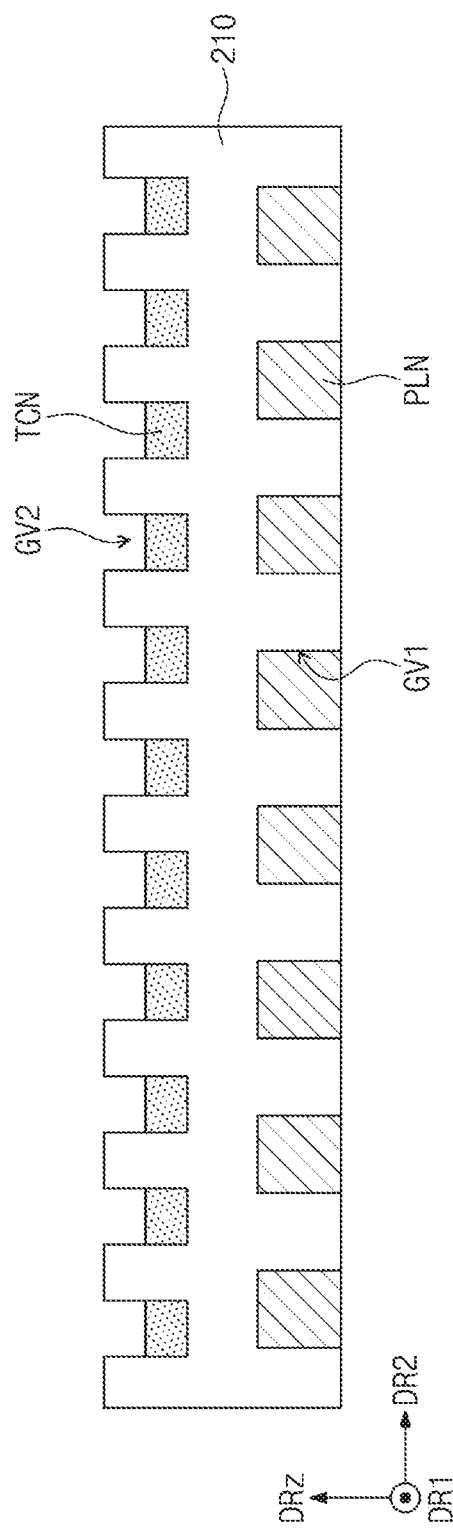
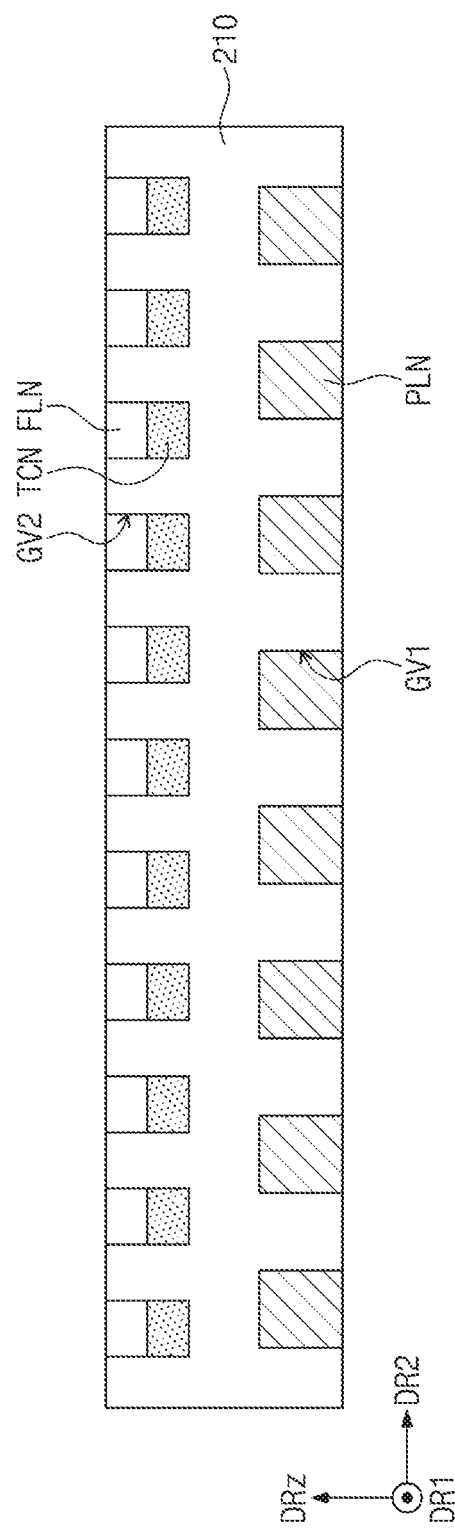

DISPLAY APPARATUS AND MANUFACTURING METHOD THEREOF

CROSS-REFERENCE TO RELATED APPLICATION

This application claims priority from and the benefit of Korean Patent Application No. 10-2016-0152194, filed Nov. 15, 2016, which is hereby incorporated by reference for all purposes as if fully set forth herein.

BACKGROUND

Field

The present disclosure relates to a display apparatus and a method of manufacturing the display apparatus.

Discussion

A variety of display devices that may be used for multimedia devices, e.g., a television set, a mobile phone, a tablet computer, a navigation unit, a game unit, etc., have been developed. To this end, a function to sense a user's fingerprint may be implemented in the display device. Various methods for fingerprint recognition may be used, such as a capacitive method using variation in capacitance of a capacitor formed between electrodes, an optical method using an optical sensor, and an ultrasonic method using a piezoelectric body.

The above information disclosed in this section is only for enhancement of an understanding of the background of the inventive concepts, and, therefore, it may contain information that does not form prior art already known to a person of ordinary skill in the art.

SUMMARY

One or more exemplary embodiments provide a window member in which a polarization film and a touch film to sense a fingerprint are integrally formed together. The window member can provide improved sensing sensitivity.

One or more exemplary embodiments provide a method of manufacturing a window member in which a polarization film and a touch film to sense a fingerprint are integrally formed together.

Additional aspects will be set forth in the detailed description which follows, and, in part, will be apparent from the disclosure, or may be learned by practice of the inventive concepts.

According to one or more exemplary embodiments, a display apparatus includes a display panel and a window member. The display panel includes pixels configured to display an image. The window member is disposed on the display panel. The window member includes a window substrate, polarization patterns, and touch patterns. The window substrate includes a first surface and a second surface. The first surface includes a first groove defined therein. The second surface faces the first surface. The second surface includes a second groove defined therein. The polarization patterns are disposed in the first groove. The touch patterns are disposed in the second groove.

According to one or more exemplary embodiments, a display apparatus includes a display panel and a window member. The display panel includes pixels configured to display an image. The window member is disposed on the display panel. The window member includes a window substrate, polarization patterns, first electrodes, and second electrodes. The window substrate includes a first surface and a second surface. The first surface includes a first groove defined therein. The second surface faces the first surface. The second surface includes a second groove defined therein. The polarization patterns are disposed in the first groove. The first electrodes are disposed in the second groove. The first electrodes extend in a first direction. The second electrodes are disposed on the second surface and the horizontal electrodes. The second electrodes extend in a second direction crossing the first direction. The second electrodes are connected to the first electrodes.

According to one or more exemplary embodiments, a method of manufacturing a display apparatus includes forming a display panel, forming a window member, and attaching the window member to the display panel. Forming the window member includes: forming a first groove in a first surface of a window substrate; forming polarization patterns in the first groove; forming a second groove in a second surface of the window substrate, the second surface facing the first surface; and forming touch patterns in the second groove.

According to one or more exemplary embodiments, polarizing patterns and touch patterns used to sense a fingerprint of a user can be included in grooves of a window member. In this manner, the window member in which the polarizing film and the touch film sensing the fingerprint are integrally formed can be provided. Thus, manufacturing costs of the window member can be reduced, and a thickness of the window member can be reduced.

According to one or more exemplary embodiments, since touch patterns can be disposed in a second groove of the window substrate, a distance between the touch patterns and a user's finger interacting with a display apparatus can become smaller than when a touch film is separately provided between the window member and a display panel. Thus, sensing sensitivity with respect to the user's fingerprint can be improved.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

FIG. 7 is an enlarged plan view of a portion AA of the second surface of the window member of FIG. 6 according to one or more exemplary embodiments.

FIGS. 15A, 15B, 15C, and 15D are cross-sectional views of a window member at various stages of forming a first groove according to one or more exemplary embodiments.

FIG. 16 is a cross-sectional view of a window member at a stage of forming polarization patterns according to one or more exemplary embodiments.

FIGS. 18A and 18B are cross-sectional views of a window member at various stages of forming touch patterns according to one or more exemplary embodiments.

DETAILED DESCRIPTION OF THE ILLUSTRATED EMBODIMENTS

Figure 1:
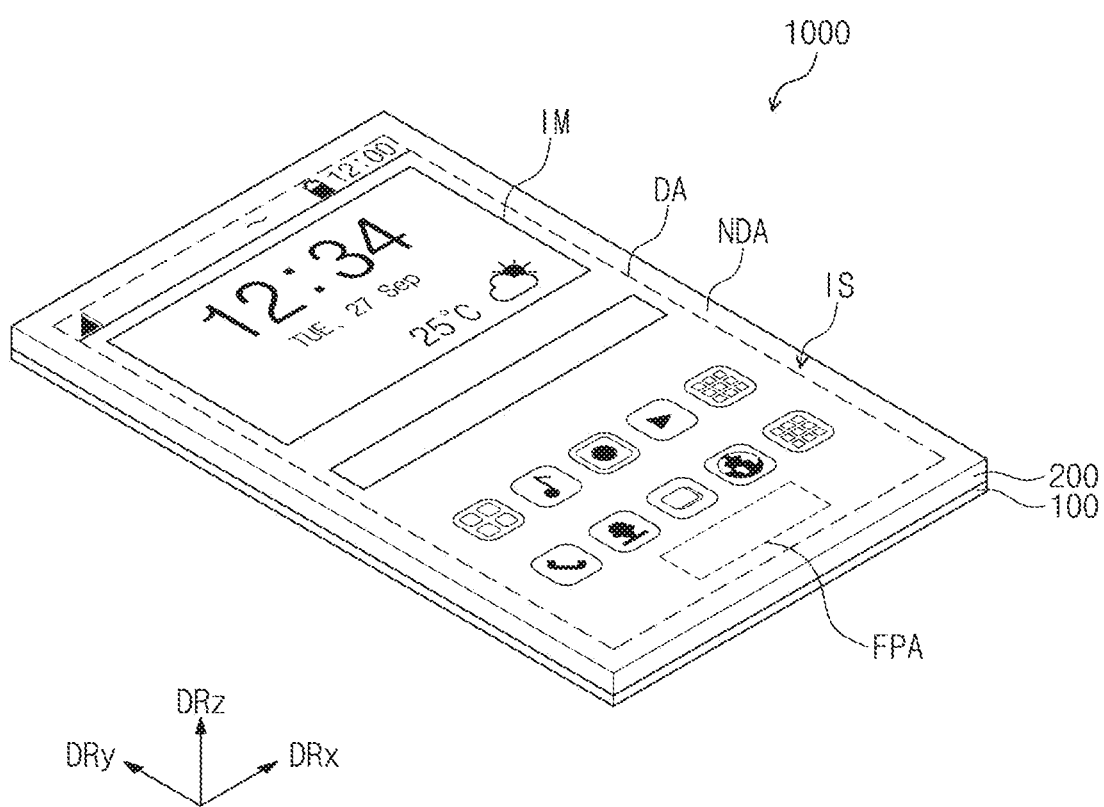
FIG. 1 is a perspective view of a display apparatus according to one or more exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

Unless otherwise specified, the illustrated exemplary embodiments are to be understood as providing exemplary features of varying detail of various exemplary embodiments. Therefore, unless otherwise specified, the features, components, modules, layers, films, panels, regions, aspects, etc. (hereinafter collectively referred to as "elements"), of the various illustrations may be otherwise combined, separated, interchanged, and/or rearranged without departing from the disclosed exemplary embodiments.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying figures, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element is referred to as being "on," "connected to," or "coupled to" another element, it may be directly on, connected to, or coupled to the other element or intervening elements may be present. When, however, an element is referred to as being "directly on," "directly connected to," or "directly coupled to" another element, there are no intervening elements present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, these elements should not be limited by these terms. These terms are used to distinguish one element from another element. Thus, a first element discussed below could be termed a second element without departing from the teachings of the present disclosure.

Spatially relative terms, such as "beneath," "below," "under," "lower," "above," "upper," "over," and the like, may be used herein for descriptive purposes, and, thereby, to describe one element's relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art. For instance, the terms "substantially," "about," and other similar terms may be used as terms of approximation to account for deviations in manufacturing tolerances.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. In this manner, regions illustrated in the drawings are schematic in nature and shapes of these regions may not illustrate the actual shapes of regions of a device, and, as such, are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 is a perspective view of a display apparatus according to one or more exemplary embodiments.

Referring to FIG. 1, a display apparatus 1000 includes a display (or active) area DA through which an image IM is displayed, and a non-display (or inactive) area NDA disposed adjacent to (or outside) the display area DA. The display area DA and the non-display area NDA are defined on a display surface IS of the display apparatus 1000. The display area DA includes a plurality of pixels PX (refer to FIG. 2) arranged therein. The image IM is not displayed through the non-display area NDA. The display surface IS of the display apparatus 1000 is an outermost surface of the display apparatus 1000 that a user looks at to use or interact with the display apparatus 1000. In FIG. 1, the display area DA has a quadrangular shape, and the non-display area NDA has a shape surrounding the display area DA. However, the shapes of the display area DA and the non-display area NDA are not limited thereto or thereby, and the display area DA and the non-display area NDA may have a variety of shapes.

The display apparatus 1000 may further include a fingerprint sensing area FPA defined on the display surface IS. Although the fingerprint sensing area FPA will be described in association with detecting fingerprint information, it is contemplated that the fingerprint sensing area FPA can be configured to sense any suitable epidermal ridge information, such as a palm print, a footprint, etc. The display apparatus 1000 may sense a user's fingerprint touched on the fingerprint sensing area FPA. In FIG. 1, the fingerprint sensing area FPA is defined in the display area DA; however, exemplary embodiments are not limited thereto or thereby. The fingerprint sensing area FPA may be defined in the non-display area NDA or the fingerprint sensing area FPA may be defined to overlap both the display area DA and the non-display area NDA.

The display apparatus 1000 includes a display panel 100 and a window member 200. The display panel 100 displays an image thereon. The display panel 100 may be, but is not limited to, various display panels, such as an organic light emitting display panel, a liquid crystal display panel, a plasma display panel, an electrophoretic display panel, an electrowetting display panel, an inorganic light emitting display panel, etc. Hereinafter, the display panel 100 will be described as an organic light emitting display panel. The window member 200 is disposed on the display panel 100. The window member 200 polarizes light incident thereto. In addition, the window member 200 senses the user's fingerprint through the fingerprint sensing area FPA as will become more apparent below.

Figure 2:
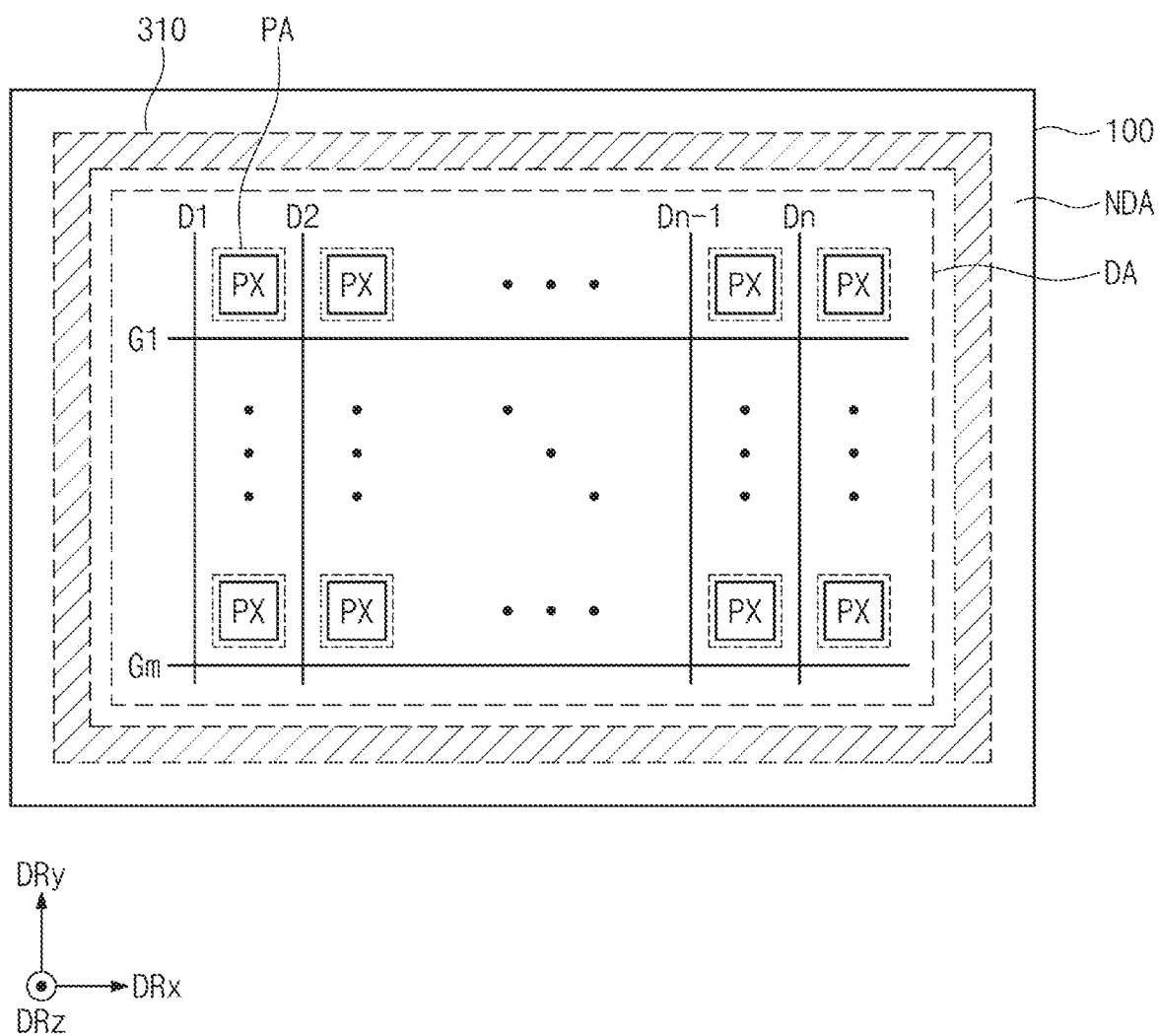
FIG. 2 is a plan view of a display panel of the display apparatus of FIG. 1 according to one or more exemplary embodiments.
Figure 3:
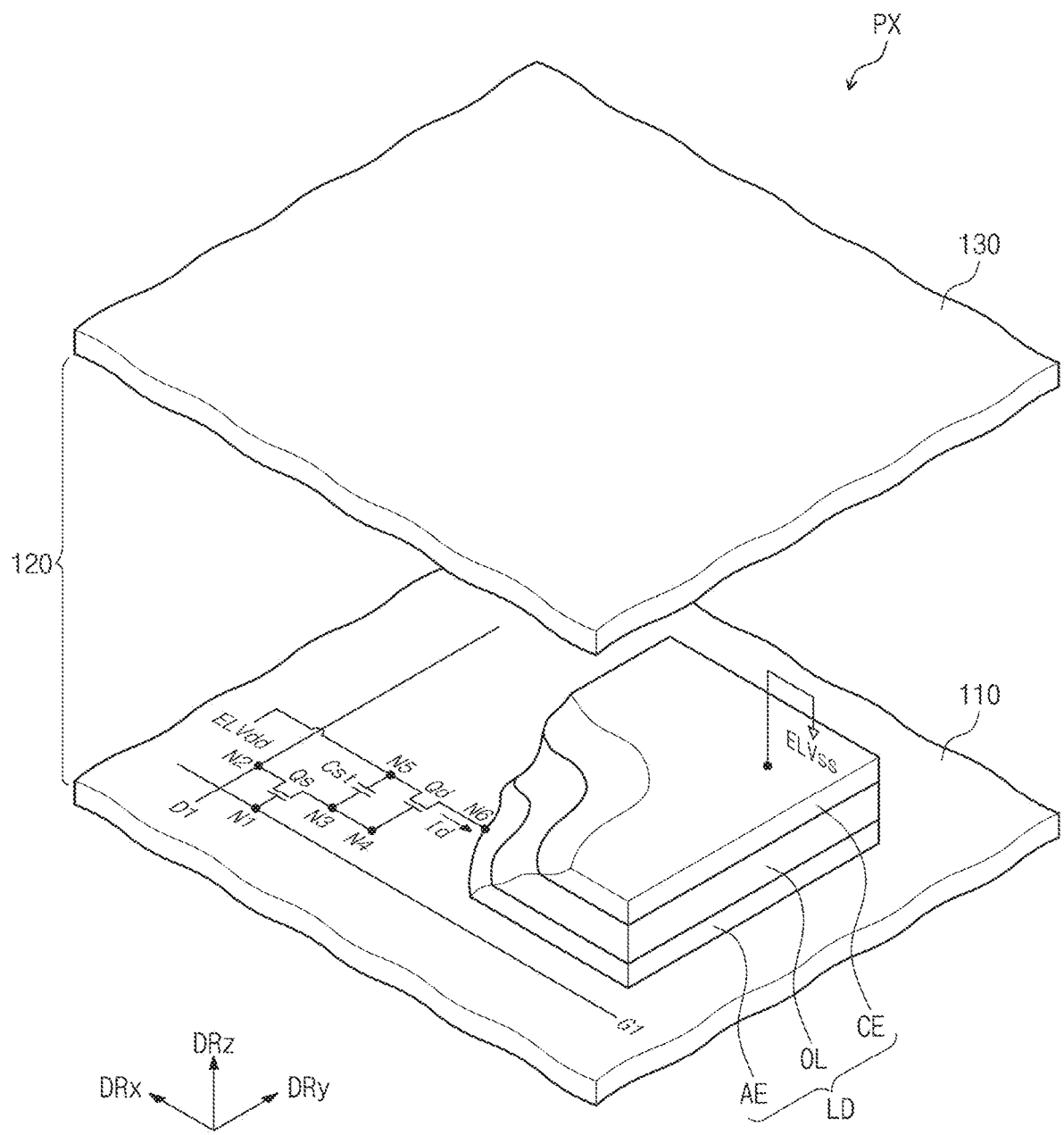
FIG. 3 is an exploded perspective view of a pixel of the display panel of FIG. 2 according to one or more exemplary embodiments.

FIG. 2 is a plan view of a display panel of the display apparatus of FIG. 1 according to one or more exemplary embodiments. FIG. 3 is an exploded perspective view of a pixel of the display panel of FIG. 2 according to one or more exemplary embodiments.

Referring to FIGS. 2 and 3, the display panel 100 includes a substrate 110, a pixel layer 120, and an encapsulation layer 130.

A plurality of pixel areas PA is defined in the display area DA.

The substrate 110 may be a flexible substrate and may include a plastic material having superior heat-resistance and durability, such as polyethylene terephthalate, polyethylene naphthalate, polycarbonate, polyarylate, polyetherimide, polyethersulfone, polyimide, etc.; however, exemplary embodiments are not limited thereto or thereby. That is, the substrate 110 may include various materials, such as, for instance, metal, glass, etc.

A barrier layer (not shown) may be disposed between the substrate 110 and the pixel layer 120 to prevent (or reduce) a foreign substance, e.g., moisture, oxygen, etc., from entering an organic light emitting element LD after passing through (or from) the substrate 110.

The pixel layer 120 may be disposed between the substrate 110 and the encapsulation layer 130. The pixel layer 120 includes a plurality of gate lines G1 to Gm, a plurality of data lines D1 to Dn, and a plurality of pixels PX. The gate lines G1 to Gm are insulated from the data lines D1 to Dn while crossing the data lines D1 to Dn. In FIG. 2, the gate lines G1 to Gm extend in an x-axis direction DRx, the data lines D1 to Dn extend in a y-axis direction DRy crossing the x-axis direction DRx, and the pixels PX generally emit light in a z-axis direction DRz. However, according to one or more exemplary embodiments, the gate lines G1 to Gm and the data lines D1 to Dn may have a curved (or non-linear) shape as long as the gate lines G1 to Gm are insulated from the data lines D1 to Dn while crossing the data lines D1 to Dn. The gate lines G1 to Gm and the data lines D1 to Dn define the pixel areas PA.

The pixels PX are disposed in the pixel areas PA, respectively. Each of the pixels PX is connected to a corresponding gate line of the gate lines G1 to Gm and a corresponding data line of the data lines D1 to Dn. The pixels PX respectively receive signals via the corresponding gate line of the gate lines G1 to Gm and the corresponding data line of the data lines D1 to Dn to display the image IM. Each pixel PX can display one of red, green, and blue colors, but exemplary embodiments are not limited thereto or thereby. That is, each pixel PX may display another color (e.g., a white color) other than the red, green, and blue colors. In FIG. 2, each of the pixels PX has a quadrangular shape, but the shape of the pixels PX is not be limited to or by the quadrangular shape. For instance, each of the pixels PX may have various shapes, such as a polygonal shape, a circular shape, an oval shape, etc.

In FIG. 3, a pixel PX connected to a first gate line G1 and a first data line D1 is shown as a representative example. The pixel PX includes a switching transistor Qs, a driving transistor Qd, a storage capacitor Cst, and the organic light emitting element LD.

The display area DA is divided into opening areas (not illustrated) overlapping the organic light emitting element LD and a non-opening area (not shown) not overlapping the organic light emitting element LD. The opening areas are areas through which the image IM is displayed, and the non-opening area is an area covered by, for instance, a light blocking member (not illustrated). Accordingly, the image IM is not displayed through the non-opening area.

The switching transistor Qs includes a control terminal N1, an input terminal N2, and an output terminal N3. The control terminal N1 is connected to the first gate line G1, the input terminal N2 is connected to the first data line D1, and the output terminal N3 is connected to the driving transistor Qd. The switching transistor Qs outputs a data voltage applied to the first data line D1 to the driving transistor Qd in response to a gate signal applied to the first gate line G1.

The driving transistor Qd includes a control terminal N4, an input terminal N5, and an output terminal N6. The control terminal N4 is connected to the output terminal N3 of the switching transistor Qs, the input terminal N5 receives a driving voltage ELVdd, and the output terminal N6 is connected to the organic light emitting element LD. The driving transistor Qd outputs an output current Id to the organic light emitting element LD. A level (or magnitude) of the output current Id varies depending on a voltage applied between the control terminal N4 and the output terminal N6.

The storage capacitor Cst is connected between the output terminal N3 of the switching transistor Qs and the input terminal N5 of the driving transistor Qd. The storage capacitor Cst is charged with the data voltage applied to the control terminal N4 of the driving transistor Qd and maintains the data voltage charged therein during a determined time after the switching transistor Qs is turned off.

The pixel layer 120 may further include a driving voltage line (not shown). The driving voltage line may extend substantially parallel to the first gate line G1 or the first data line D1. The driving voltage line may receive the driving voltage ELVdd and may be connected to the input terminal N5 of the driving transistor Qd.

The organic light emitting element LD includes a first electrode AE, an organic layer OL, and a second electrode CE.

The first electrode AE may be an anode electrode or a positive electrode. The first electrode AE is connected to the output terminal N6 of the driving transistor Qd and generates holes. The second electrode CE may be a cathode electrode or a negative electrode. The second electrode CE receives a common voltage ELVss and generates electrons. The organic layer OL is disposed between the first electrode AE and the second electrode CE. The organic layer OL may include a plurality of layers and include an organic material.

The holes and the electrons are injected into an organic light emitting layer (not shown) of the organic layer OL respectively through the first electrode AE and the second electrode CE. The holes and the electrons are recombined in the organic light emitting layer to generate excitons, and the organic light emitting layer emits light by the excitons that return to a ground state from an excited state. An intensity of the light emitted from the organic light emitting layer may be determined by the output current Id flowing through the output terminal N6 of the driving transistor Qd. In an exemplary embodiment, the organic layer OL includes two or more organic light emitting layers that emit different colored lights from each other.

In FIG. 3, the second electrode CE is disposed on the first electrode AE, but exemplary embodiments are not limited thereto or thereby. For instance, positions of the first electrode AE and the second electrode CE may be changed with respect to each other.

The encapsulation layer 130 is disposed on the pixel layer 120. The encapsulation layer 130 covers the display area DA. The encapsulation layer 130 may include at least one of an organic layer or an inorganic layer; however, exemplary embodiments are not limited thereto or thereby. For instance, the encapsulation layer 130 may include a glass substrate or a plastic substrate. It is also contemplated that the encapsulation layer 130 may include at least one organic layer and at least one inorganic layer stacked in an alternating manner. To this end, the number of organic layers and inorganic layers may be the same or different from one another.

The display apparatus 1000 may further include a sealing member 310. The sealing member 310 is disposed to surround the display area DA and attaches the substrate 110 to the encapsulation layer 130. Together with the encapsulation layer 130, the sealing member 310 prevents (or reduces) the organic light emitting element LD from being exposed to external contaminants, such as moisture and air.

Figure 4:
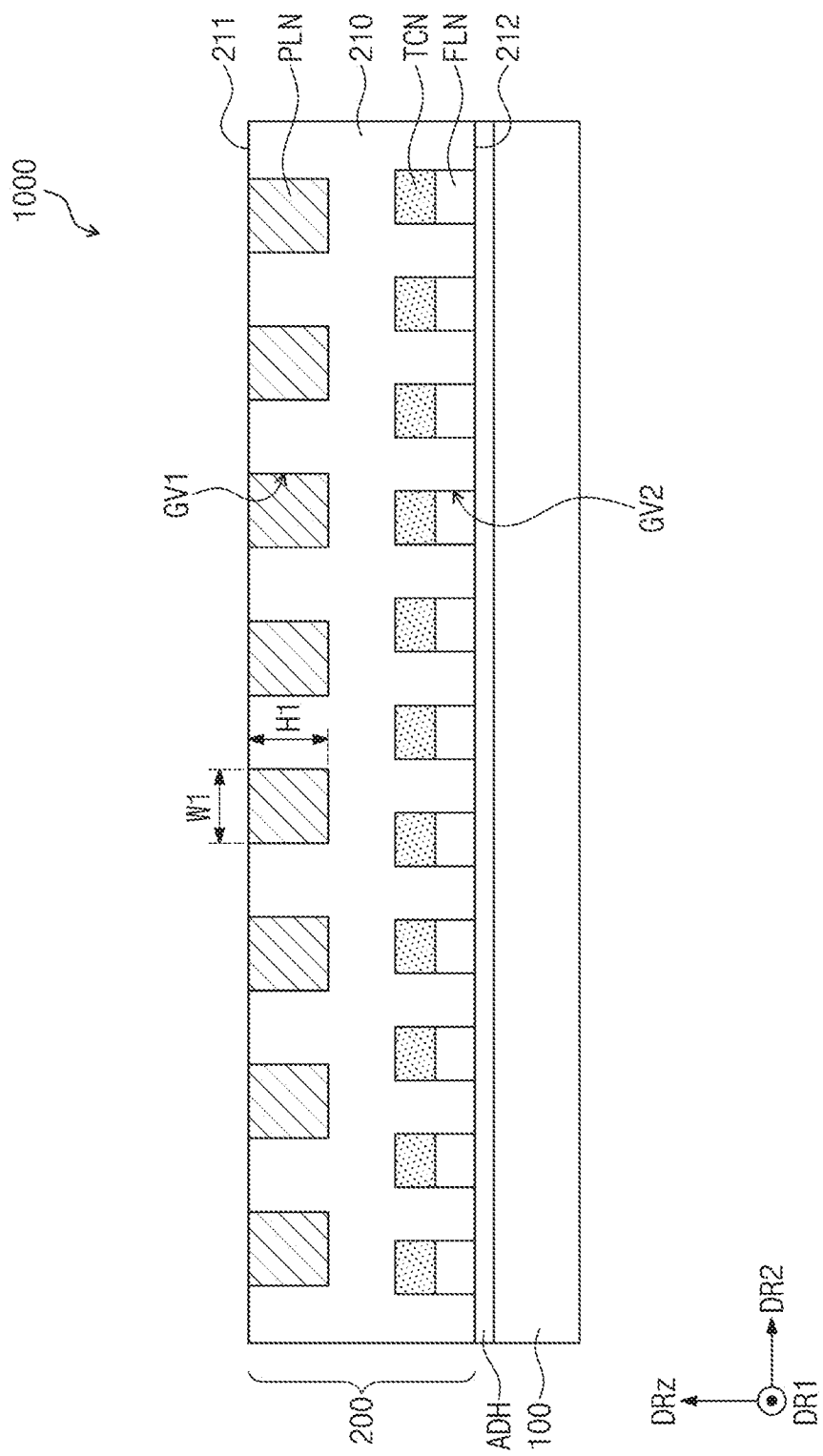
FIG. 4 is a cross-sectional view of the display apparatus of FIG. 1 according to one or more exemplary embodiments.

FIG. 4 is a cross-sectional view of the display apparatus of FIG. 1 according to one or more exemplary embodiments.

Referring to FIG. 4, the window member 200 includes a window substrate 210, polarization patterns PLN, and touch patterns TCN.

The window substrate 210 includes a first surface 211 and a second surface 212 facing the first surface 211. The first surface 211 is further from the display panel 100 than the second surface 212. For instance, the first surface 211 is further spaced apart from the display panel 100 than is the second surface 212.

The window substrate 210 may be transparent or semi-transparent. The window substrate 210 may include a glass material, but exemplary embodiments are not limited thereto or thereby. For instance, the window substrate 210 may include a plastic material, such as polyimide or polyurethane.

The first surface 211 is provided with a first groove GV1 defined therein, and the second surface 212 is provided with a second groove GV2 defined therein. The polarization patterns PLN are disposed in the first groove GV1. The polarization patterns PLN polarize light incident thereto, e.g., incident to the window member 200. Details of the polarization patterns PLN will be described later. The touch patterns TCN are disposed in the second groove GV2. The touch patterns TCN sense a user's fingerprint. Details of the touch patterns TCN will also be described later. It is noted, however, that the polarization patterns PLN are spaced apart from the touch patterns TCN in the z-axis direction DRz.

The window member 200 may further include a filling agent FLN. The filling agent FLN is disposed in the second groove GV2 and seals the touch patterns TCN. The filling agent FLN prevents the touch patterns TCN from being exposed through the second groove GV2. The filling agent FLN includes an insulating material. The filling agent FLN prevents (or reduces) interference between the touch patterns TCN and other electrodes or wires.

The display apparatus 1000 may further include an adhesive layer ADH disposed between the window member 200 and the display panel 100. The adhesive layer ADH attaches the window member 200 to the display panel 100.

According to one or more exemplary embodiments, the window member 200 includes the polarization patterns PLN and the touch patterns TCN used to sense the user's fingerprint. Therefore, a polarization film and a touch film to sense the user's fingerprint may be integrally formed in the window member 200. Accordingly, manufacturing cost of the window member 200 may be reduced, and a thickness of the window member 200 may be decreased.

As the thickness of the window member 200 becomes thinner and a dielectric constant of the window substrate 210 becomes higher, the sensing sensitivity with respect to the user's fingerprint increases. Further, since the touch patterns TCN are disposed in the second groove GV2 of the window substrate 210, a distance between the touch patterns TCN and a user's finger interacting with (e.g., touched on) the display apparatus 1000 can be smaller than when a touch film is separately provided between the window member 200 and the display panel 100. As such, the sensing sensitivity with respect to the user's fingerprint may be improved.

Figure 5:
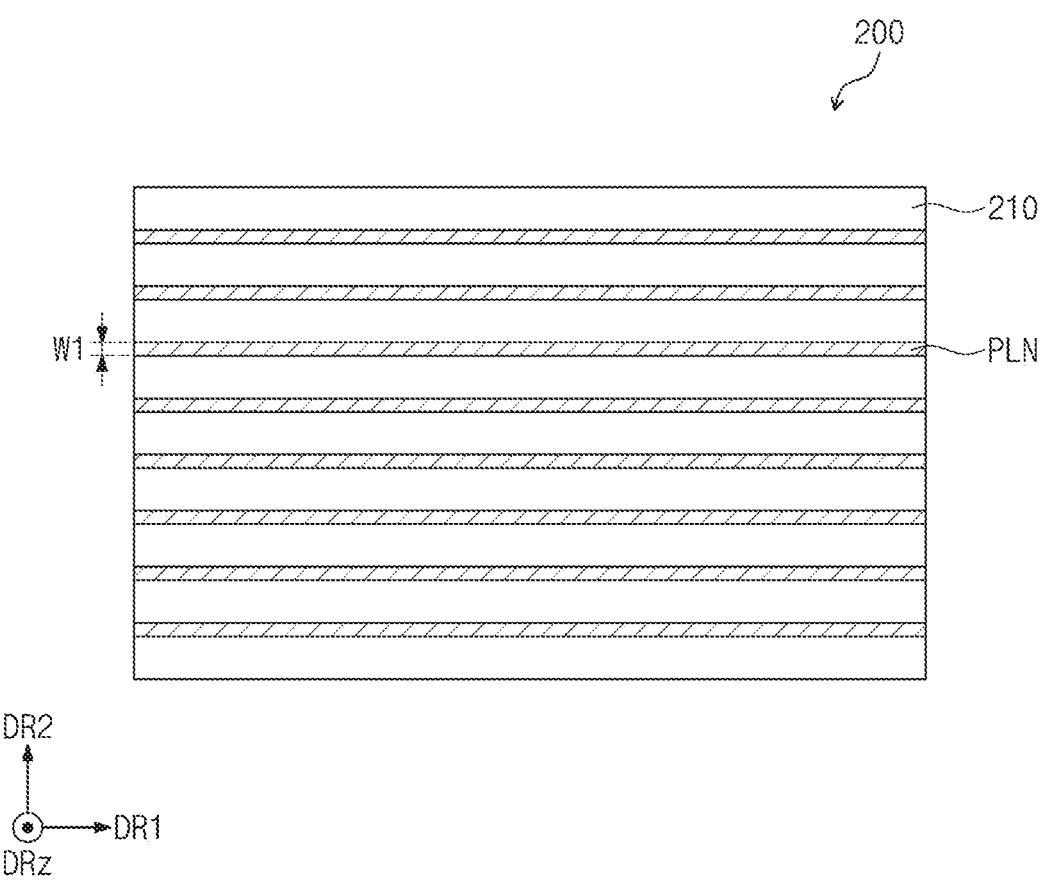
FIG. 5 is a plan view of a first surface of a window member according to one or more exemplary embodiments.

FIG. 5 is a plan view of a first surface of a window member according to one or more exemplary embodiments.

Referring to FIGS. 4 and 5, the polarization patterns PLN extend in a first direction DR1. The polarization patterns PLN are spaced apart from each other in a second direction DR2. The first direction DR1 is substantially perpendicular to the second direction DR2.

The polarization patterns PLN include a material having a refractive index greater than the refractive index of the window substrate 210. The polarization patterns PLN may include at least one of silver nanowire (AgNW), a carbon nanotube (CNT), a graphene, a liquid crystal, etc. Additionally or alternatively, the polarization patterns PLN may include at least one metal selected from the group consisting of aluminum (Al), chromium (Cr), gold (Au), silver (Ag), copper (Cu), nickel (Ni), iron (Fe), tungsten (W), cobalt (Co), and molybdenum (Mo). In this manner, the at least one metal may include an alloy including at least one of aluminum (Al), chromium (Cr), gold (Au), silver (Ag), copper (Cu), nickel (Ni), iron (Fe), tungsten (W), cobalt (Co), and molybdenum (Mo). Exemplary embodiments, however, are not limited to or by the aforementioned materials for the polarization patterns PLN. The polarization patterns PLN serve as a linear polarization plate that transmits light vibrating in the first direction DR1 among light incident thereto.

In one or more exemplary embodiments, the polarization patterns PLN have a width W1 of about 50 nm to about 150 nm in the second direction DR2, such as about 75 nm to about 125 nm, e.g., about 75 nm to about 150 nm, for instance, about 50 nm to about 125 nm, and the like. In addition, the first groove GV1 has a depth H1 of about 100 nm to about 500 nm, such as about 250 nm to about 350 nm, for example, about 275 nm to about 325 nm, e.g., about 250 nm to about 500 nm, for instance, about 100 nm to about 350 nm, and the like.

Figure 6:
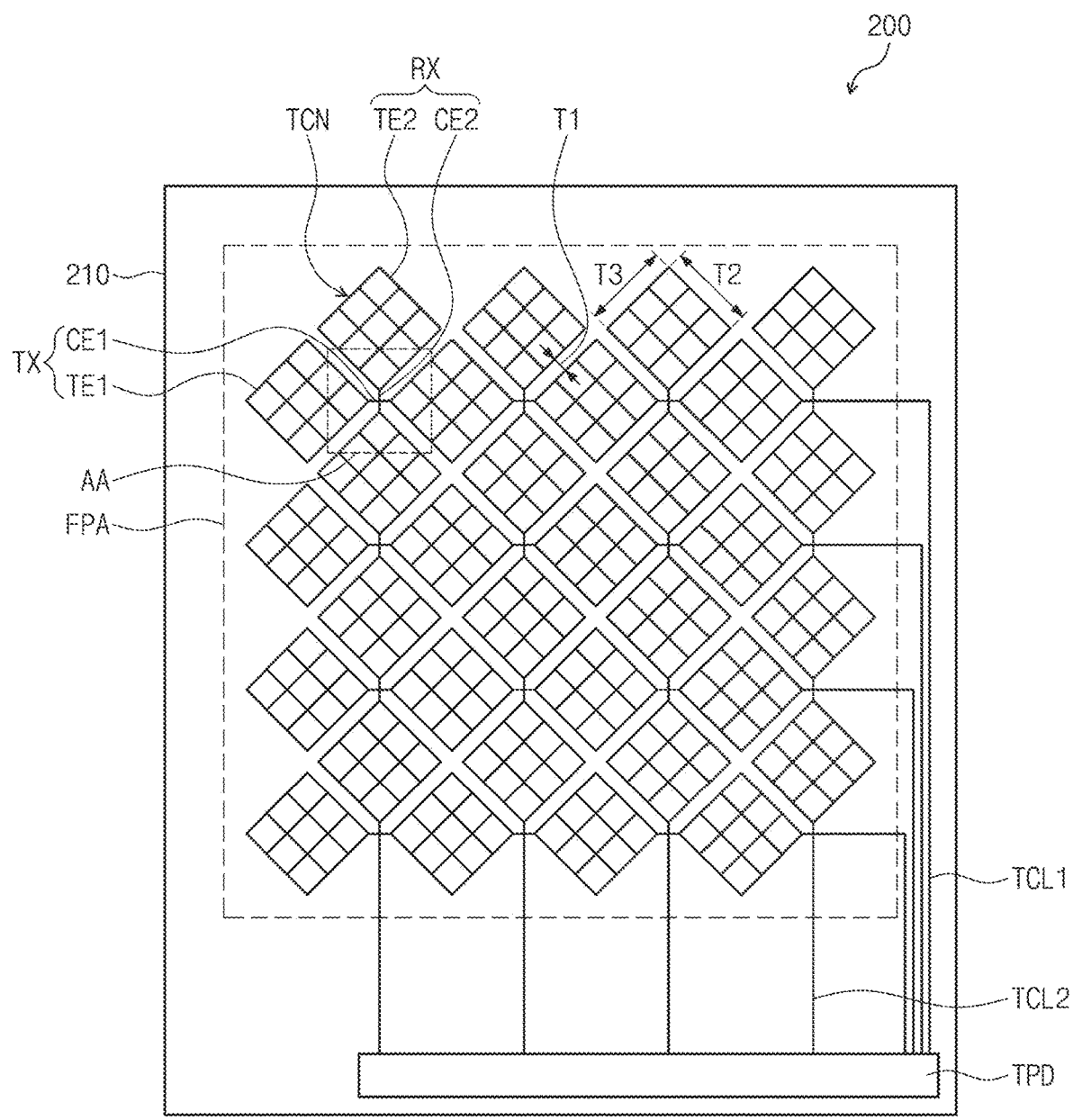
FIG. 6 is a plan view of a second surface of the window member according to one or more exemplary embodiments.

FIG. 6 is a plan view of a second surface of the window member according to one or more exemplary embodiments.

Referring to FIGS. 1, 4, and 6, the touch patterns TCN may be arranged in the fingerprint sensing area FPA. The touch patterns TCN may include a conductive layer to sense the user's fingerprint by a self-capacitive method, or the touch patterns TCN may include two or more conductive layers insulated from each other to sense the user's fingerprint by a mutual capacitive method. For descriptive convenience, the touch patterns TCN will be described as implemented by the mutual capacitive method, but exemplary embodiments are not limited thereto or thereby. The touch patterns TCN may sense the user's fingerprint using a difference in capacitance in accordance with a distance between a ridge and a valley of the user's fingerprint.

The touch patterns TCN include first touch lines TX and second touch lines RX insulated from the first touch lines TX while crossing the first touch lines TX.

The first touch lines TX extend in a third direction DR3 and are spaced apart from each other in a fourth direction DR4. The second touch lines RX extend in the fourth direction DR4 and are spaced apart from each other in the third direction DR3. The third direction DR3 and the fourth direction DR4 cross each other.

The first touch lines TX and the second touch lines RX may sense the user's fingerprint on the basis of the variation in the capacitance. Since the first touch lines TX and the second touch lines RX are used to sense the user's fingerprint, the first touch lines TX and the second touch lines RX have a size smaller than a conventional touch sensing electrode.

A width of each of the touch patterns TCN and a distance between adjacent touch patterns TCN may be greater than or equal to than about 5 μm and less than or equal to about 100 μm, such as greater than or equal to than about 30 μm and less than or equal to about 75 μm, for example, greater than or equal to than about 40 μm and less than or equal to about 65 μm, e.g., greater than or equal to than about 5 μm and less than or equal to about 75 μm, for instance, greater than or equal to than about 30 μm and less than or equal to about 100 μm, and the like. For example, a distance T1 between the first touch lines TX and between the second touch lines RX may be greater than or equal to about 5 μm and less than or equal to about 100 μm. A fifth direction DR5 and a sixth direction DR6, which are perpendicular to each other and have the shortest distance between a first touch electrode TE1 of the first touch lines TX and a second touch electrode TE2 of the second touch lines RX, may be defined. A width T2 of each of the first touch lines TX measured in the fifth direction DR5 or the sixth direction DR6 may be greater than or equal to than about 5 μm and less than or equal to 100 μm. A width T3 of each of the second touch lines RX measured in the fifth direction DR5 or the sixth direction DR6 may be greater than or equal to about 5 μm and less than or equal to about 100 μm.

The second groove GV2 overlaps the non-opening area defined between the opening areas overlapping the organic light emitting element LD of the pixel PX. In this manner, the first touch lines TX and the second touch lines RX may overlap the non-opening area. The first touch lines TX and the second touch lines RX may not exert influence (e.g., deterioration of brightness) on a brightness of the display apparatus 1000.

The window member 200 may further include a touch pad TPD, a first trace line TCL1, and a second trace line TCL2.

The first trace line TCL1 connects the first touch lines TX to the touch pad TPD, and the second trace line TCL2 connects the second touch lines RX to the touch pad TPD. The touch pad TPD provides a signal to the first touch lines TX and the second touch lines RX through the first trace lines TCL1 and the second trace lines TCL2 or receives a signal from the first touch lines TX and the second touch lines RX through the first trace line TCL1 and the second trace line TCL2. The touch pad TPD, the first trace line TCL1, and the second trace line TCL2 may be arranged in the second groove GV2.

Figure 8:
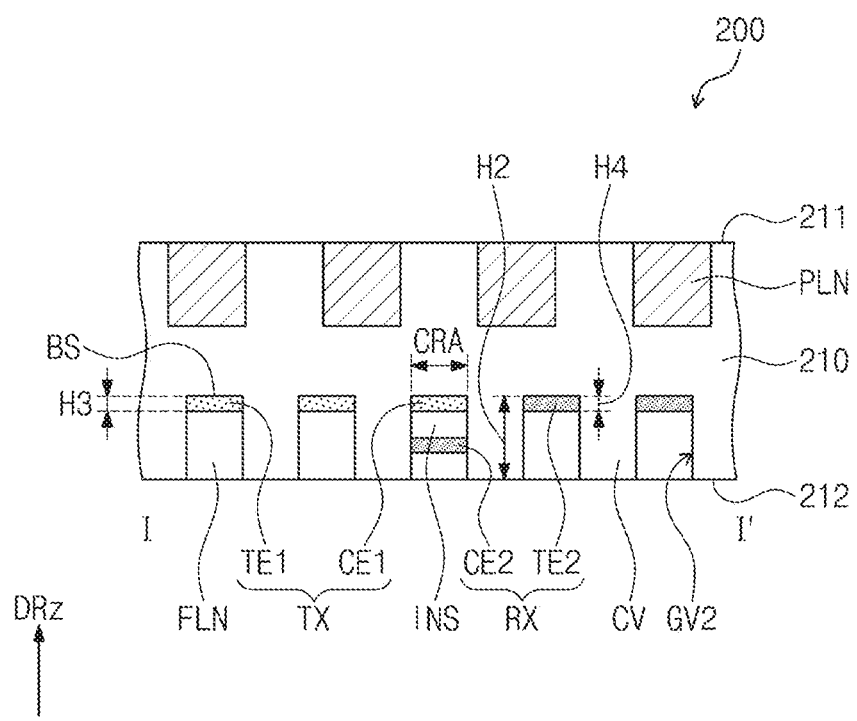
FIG. 8 is a cross-sectional view of the window member of FIG. 7 taken along sectional line I-I' according to one or more exemplary embodiments.

FIG. 7 is an enlarged plan view of a portion AA of the second surface of the window member of FIG. 6 according to one or more exemplary embodiments. FIG. 8 is a cross-sectional view of the window member of FIG. 7 taken along sectional line I-I' according to one or more exemplary embodiments.

According to one or more exemplary embodiments, the second groove GV2 may have a grid shape when viewed in a plan view, e.g., when viewed in a direction normal to the second surface 212. That is, the second surface 212 of the window substrate 210 may include convex portions CV protruded in an island shape and arranged in a matrix form, and the second groove GV2 is defined between the convex portions CV. The pixels PX may be arranged in the convex portions CV when viewed in a plan view.

The first touch lines TX include a first touch electrode TE1 and a first connection electrode CE1. The first connection electrode CE1 connects the first touch electrodes TE1 to each other that are disposed adjacent to each other in the third direction DR3. The second touch lines RX include a second touch electrode TE2 and a second connection electrode CE2. The second connection electrode CE2 connects the second touch electrodes TE2 to each other that are disposed adjacent to each other in the fourth direction DR4. The first touch electrode TE1 and the second touch electrode TE2 may have a mesh shape.

Referring to FIGS. 7 and 8, a width of the second groove GV2 can be the same as the width of the first touch lines TX, and the width of the second touch lines RX in the second groove GV2; however, exemplary embodiments are not limited thereto or thereby. For instance, the width of the first touch lines TX and/or the width of the second touch lines RX may be smaller than the width of the second groove GV2.

In one or more exemplary embodiments, each of a height H3 of the first touch lines TX and a height H4 of the second touch lines RX is smaller than a depth H2 of the second groove GV2. In addition, a sum of the height H3 of the first touch lines TX and the height H4 of the second touch lines RX may be smaller than the depth of the second groove GV2.

The first touch electrode TE1 and the first connection electrode CE1 are disposed on a bottom surface BS of the second groove GV2. The first touch electrode TE1 and the first connection electrode CE1 are disposed on the same layer as one another.

The window member 200 may further include an insulating layer INS disposed between the first connection electrode CE1 and the second connection electrode CE2 in a cross-area CRA of the first connection electrode CE1 and the second connection electrode CE2. The first connection electrode CE1 and the second connection electrode CE2 are insulated from each other by the insulating layer INS. The insulating layer INS may be disposed in an area other than the cross-area CRA of the first connection electrode CE1 and the second connection electrode CE2. For descriptive convenience, the insulating layer INS will be described as being disposed to overlap with the cross-area CRA of the first connection electrode CE1 and the second connection electrode CE2 as a representative example.

The second touch electrode TE2 is disposed on the bottom surface BS of the second groove GV2. In a case that the insulating layer INS is disposed to overlap with an area other than the cross-area CRA of the first connection electrode CE1 and the second connection electrode CE2, the second touch electrode TE2 may be disposed on the insulating layer INS.

Figure 9:
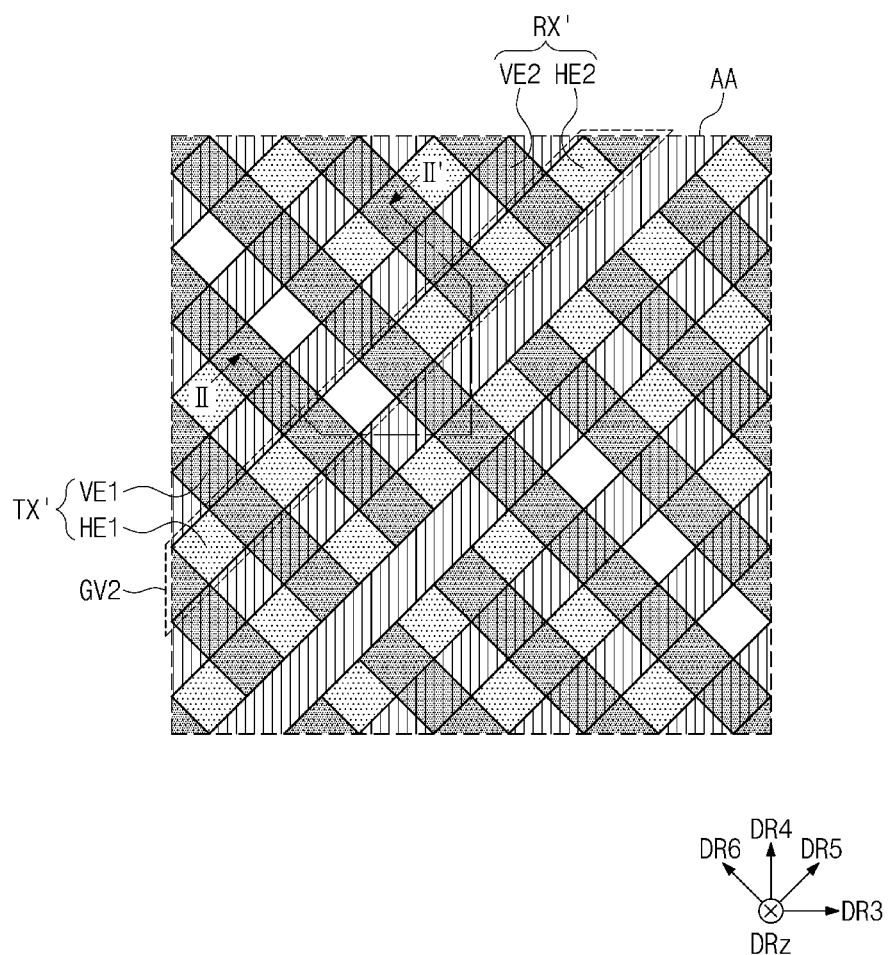
FIG. 9 is an enlarged plan view of the portion AA of a window member of FIG. 6 according to one or more exemplary embodiments.
Figure 10:
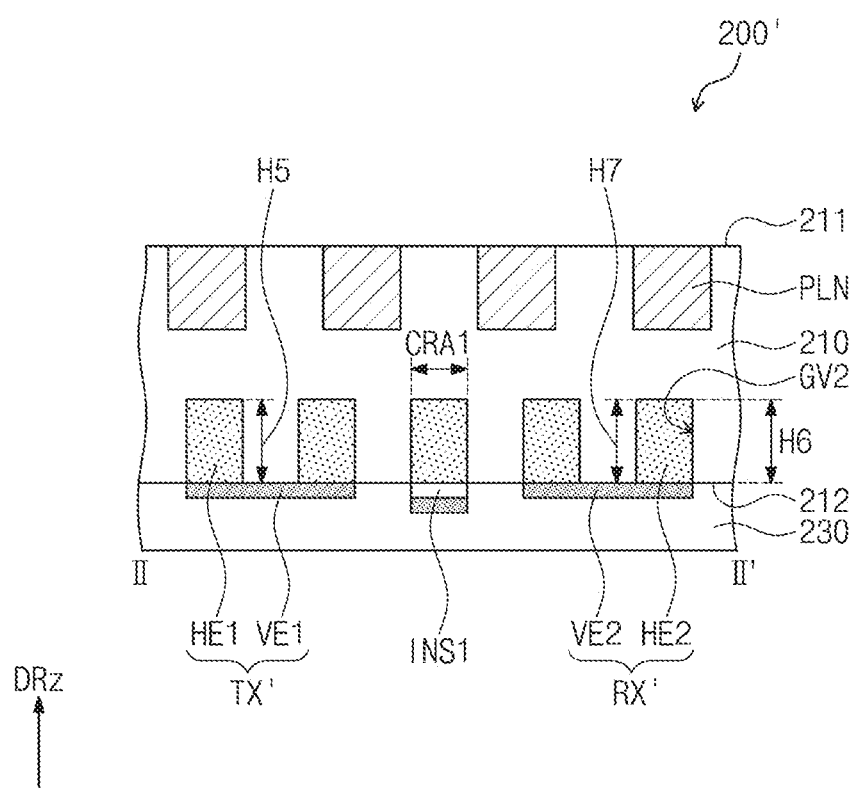
FIG. 10 is a cross-sectional view of the window member of FIG. 9 taken along sectional line II-II' according to one or more exemplary embodiments.

FIG. 9 is an enlarged plan view of the portion AA of the window member of FIG. 6 according to one or more exemplary embodiments. FIG. 10 is a cross-sectional view of the window member of FIG. 9 taken along sectional line II-II' according to one or more exemplary embodiments. The window member, the first touch lines, and the second touch lines of FIGS. 9 and 10 are similar to the window member, the first touch lines, and the second touch lines of FIGS. 7 and 8, and, as such, will be designated as window member 200', first touch lines TX', and second touch lines RX'. Duplicative descriptions will be primarily omitted to avoid obscuring exemplary embodiments.

According to one or more exemplary embodiments, a second groove GV2 may have a stripe shape when viewed in a plan view. The second groove GV2 may have a shape extending in the fifth direction DR5. The second groove GV2 may be provided in a plural number, and the second grooves GV2 may be spaced apart from each other in the sixth direction DR6. The third to sixth directions DR3 to DR6 may cross each other.

First touch lines TX' include a first horizontal electrode HE1 and a first vertical electrode VE1. The first horizontal electrode HE1 is disposed in the second groove GV2 and extends in the fifth direction DR5. The first horizontal electrode HE1 has a height H5 that is substantially the same as a depth H6 of the second groove GV2.

The first vertical electrode VE1 is disposed on a second surface 212 of the window substrate 210 and the first horizontal electrode HE1. The first vertical electrode VE1 extends in the sixth direction DR6. The first vertical electrode VE1 connects the first horizontal electrodes HE1 to each other. When viewed in a plan view, a shape obtained by overlapping the first horizontal electrode HE1 with the first vertical electrode VE1 may be a mesh shape.

Second touch lines RX' include a second horizontal electrode HE2 and a second vertical electrode VE2. The second horizontal electrode HE2 is disposed in the second groove GV2 and extends in the fifth direction DR5. The second horizontal electrode HE2 has a height H7 that is substantially the same as the depth H6 of the second groove GV2. The second horizontal electrode HE2 is disposed on the same layer as the first horizontal electrode HE1.

The second vertical electrode VE2 is disposed on a second surface 212 of the window substrate 210 and the second horizontal electrode HE2. The second vertical electrode VE2 extends in the sixth direction DR6. The second vertical electrode VE2 connects the second horizontal electrodes HE2 to each other. When viewed in a plan view, a shape obtained by overlapping the second horizontal electrode HE2 with the second vertical electrode VE2 may be a mesh shape.

As seen in FIGS. 9 and 10, the width of the second groove GV2 is the same as the width of the first horizontal electrode HE1 and the width of the second horizontal electrode HE2, but exemplary embodiments are not be limited thereto or thereby. For instance, the width of the first horizontal electrode HE1 and/or the width of the second horizontal electrode HE2 may be smaller than the width of the second groove GV2.

The window member 200' may further include an insulating layer INS1 disposed between the first horizontal electrode HE1 and the second vertical electrode VE2 in a cross-area CRA1 of the first touch lines TX' and the second touch lines RX'. The first horizontal electrode HE1 and the second vertical electrode VE2 are insulated from each other by the insulating layer INS1.

The window member 200' may further include an electrode protection layer 230 covering the first vertical electrode VE1 and the second vertical electrode VE2. The electrode protection layer 230 protects the first vertical electrode VE1 and the second vertical electrode VE2, and allows the window member 200' to be more easily attached to the display panel 100.

Figure 11:
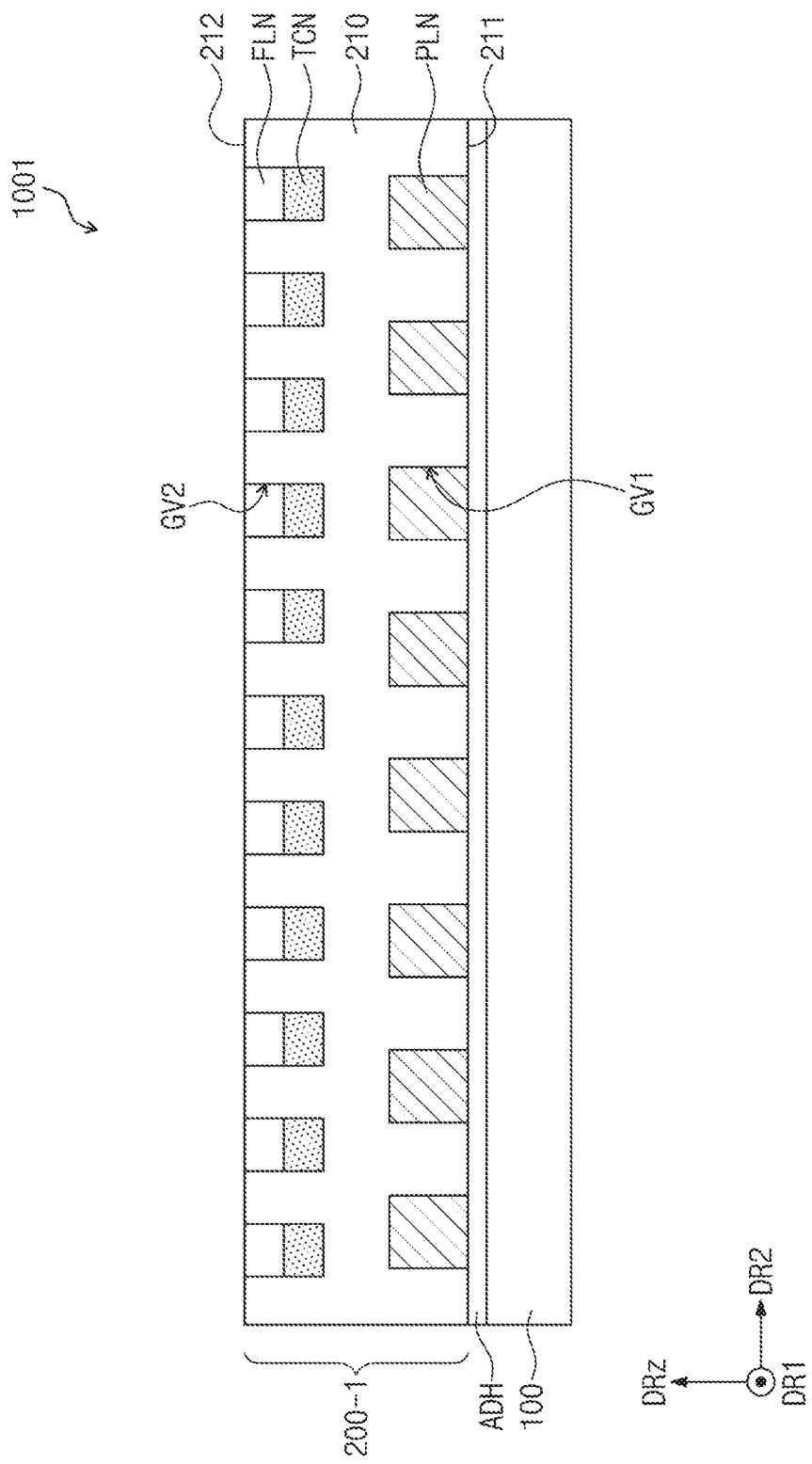
FIG. 11 is a cross-sectional view of a display apparatus according to one or more exemplary embodiments.

FIG. 11 is a cross-sectional view of a display apparatus according to one or more exemplary embodiments.

The display apparatus 1001 shown in FIG. 11 has substantially the same structure and function as those of the display apparatus 1000 described with reference to FIG. 4 except for a structure of a window member 200-1 that is disposed upside down when compared with the window member 200 of the display apparatus 1000. Duplicative descriptions will be primarily omitted to avoid obscuring exemplary embodiments.

Referring to FIG. 11, a window substrate 210 includes a first surface 211 and a second surface 212 facing the first surface 211. The second surface 212 is further spaced apart from a display panel 100 than is the first surface 211. The first surface 211 is provided with a first groove GV1 defined therein, and the second surface 212 is provided with a second groove GV2 defined therein. Touch patterns TCN are disposed in the second groove GV2. The touch patterns TCN sense a user's fingerprint. Polarization patterns PLN are disposed in the first groove GV1. The polarization patterns PLN polarize light incident thereto.

Even though a position of the touch patterns TCN and a position of the polarization patterns PLN are changed with respect to each other, a polarization film and a touch film are integrally formed in the window member 200-1. In addition, since the touch patterns TCN are disposed in the second groove GV2 of the window substrate 210, a distance between the touch patterns TCN and the user's finger interacting with (e.g., touching) the display apparatus 1001 becomes smaller than when a touch film is separately provided between the window member 200-1 and the display panel 100. In this manner, the sensing sensitivity with respect to the user's fingerprint may be improved.

Figure 12:
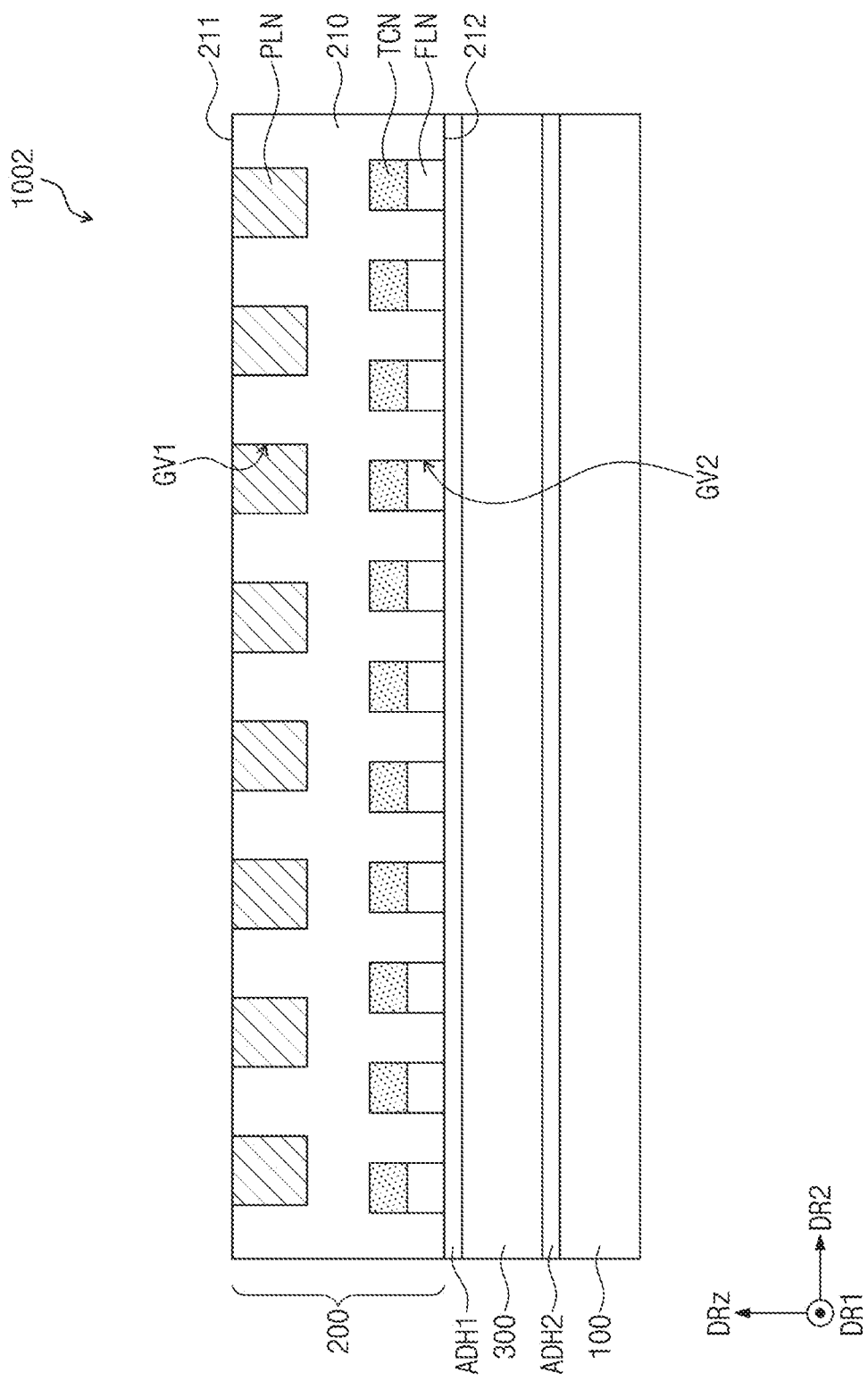
FIG. 12 is a cross-sectional view of a display apparatus according to one or more exemplary embodiments.

FIG. 12 is a cross-sectional view of a display apparatus according to one or more exemplary embodiments.

The display apparatus 1002 shown in FIG. 12 has substantially the same structure and function as those of the display apparatus 1000 described with reference to FIG. 4 except that the display apparatus 1002 further includes a touch sensing unit 300. Duplicative descriptions will be primarily omitted to avoid obscuring exemplary embodiments.

The display apparatus 1002 further includes the touch sensing unit (or structure) 300. The touch sensing unit 300 is disposed between the display panel 100 and the window member 200. The display panel 100 and the touch sensing unit 300 are bonded to each other by a second adhesive layer ADH2, and the touch sensing unit 300 and the window member 200 are bonded to each other by a first adhesive layer ADH1.

The touch sensing unit 300 may sense a user's touch or other interaction with display apparatus 1002, e.g., a hovering interaction, etc. Although not illustrated, the touch sensing unit 300 may include a plurality of electrodes, and the electrodes of the touch sensing unit 300 may overlap with the touch patterns TCN. The touch sensing unit 300 may not have a sensitivity that is fine enough to sense the user's fingerprint that may be a result of a distance between the touch sensing unit 300 and the user's finger being too far to sense the user's fingerprint due to a thickness of the window member 200.

In FIG. 12, the touch sensing unit 300 is provided as a separate panel, but exemplary embodiments are not limited thereto or thereby. The electrodes of the touch sensing unit 300 may be directly formed on the display panel 100 to sense a touch event.

Figure 13:
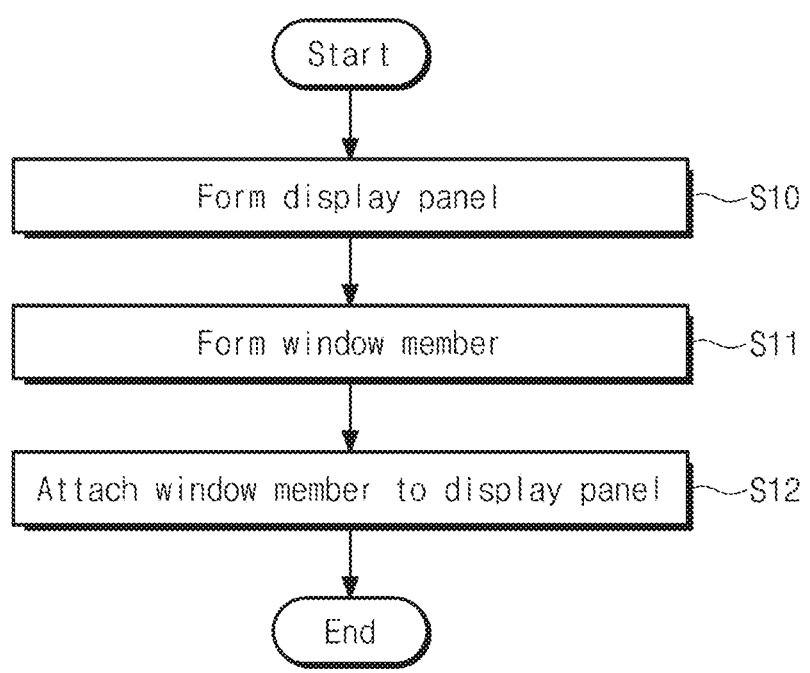
FIG. 13 is a flowchart of a process of manufacturing a display apparatus according to one or more exemplary embodiments.

FIG. 13 is a flowchart of a process of manufacturing a display apparatus according to one or more exemplary embodiments.

Referring to FIGS. 1 and 13, the display panel 100 is formed (S10). The display panel 100 may be one of various display panels. The window member 200 is formed (S11), which is described in more detail in association with FIG. 14. The window member 200 is a window member implemented to perform a linear polarization function and a fingerprint sensing function. The window member 200 is attached to the display panel 100 (S12).

Figure 14:
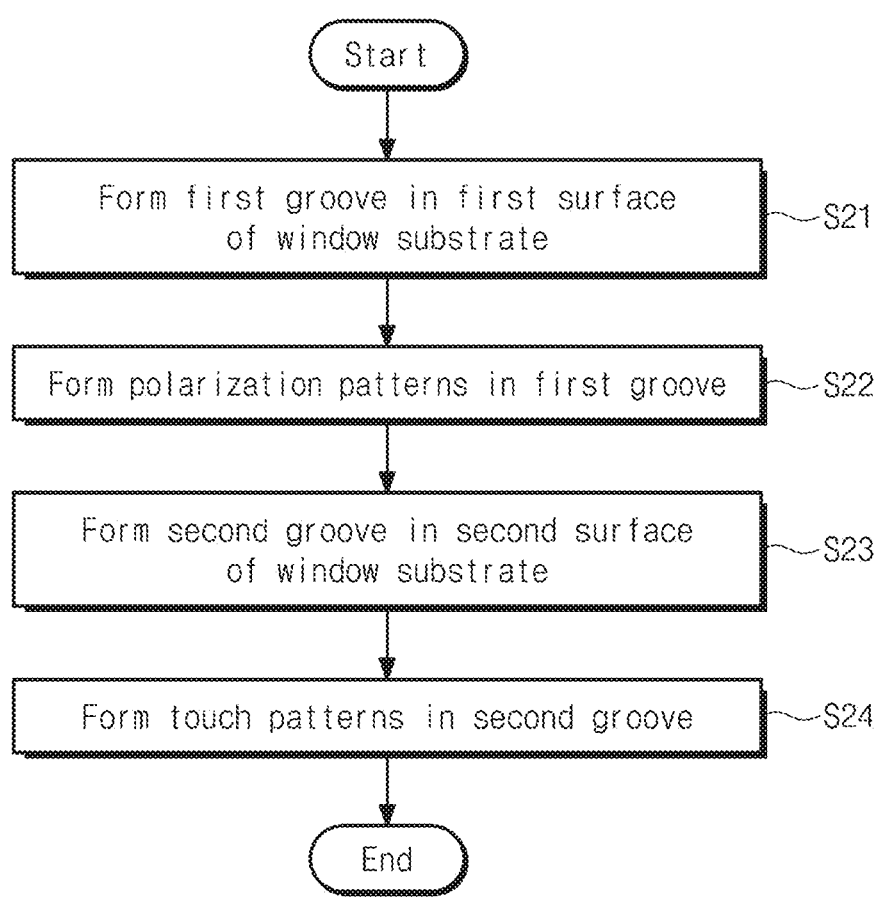
FIG. 14 is a flowchart of a process of forming a window member according to one or more exemplary embodiments.

FIG. 14 is a flowchart of a process of forming a window member according to one or more exemplary embodiments.

Referring to FIGS. 4 and 14, the first groove GV1 is formed in the first surface 211 of the window substrate 210 (S21). The polarization patterns PLN are formed in the first groove GV1 (S22). The second groove GV2 is formed in the second surface 212 of the window substrate 210 (S23). The touch patterns TCN are formed in the second groove GV2 (S24).

Operations S21 to S24 may be sequentially performed in the described order as shown in FIG. 14, but exemplary embodiments are not limited thereto or thereby. According to one or more exemplary embodiments, operations S23 and S24 may be performed prior to operations S21 and S22, and then operations S21 and S22 may be performed. It is also contemplated that one or more of the operations may be simultaneously performed, such as operations S21 and S23.

FIGS. 15A to 15D are cross-sectional views of a window member at various stages of forming a first groove according to one or more exemplary embodiments. Operation S21 will be described with reference to FIGS. 15A to 15D.

Referring to FIG. 15A, a first resin RS1 is coated on the first surface 11 of a substrate 2101.

Referring to FIG. 15B, a first mold MD1 having a concave-convex portion formed on a surface thereof is prepared. The concave-convex portion of the first mold MD1 has a size on the order of about tens of nanometers. The concave-convex portion of the first mold MD1 is disposed to face the first resin RS1 to form a patterned first resin RS11 through an imprint process. The patterned first resin RS11 includes a surface that is complementary to the concave-convex portion of the first mold MD1.

Figure 15C:
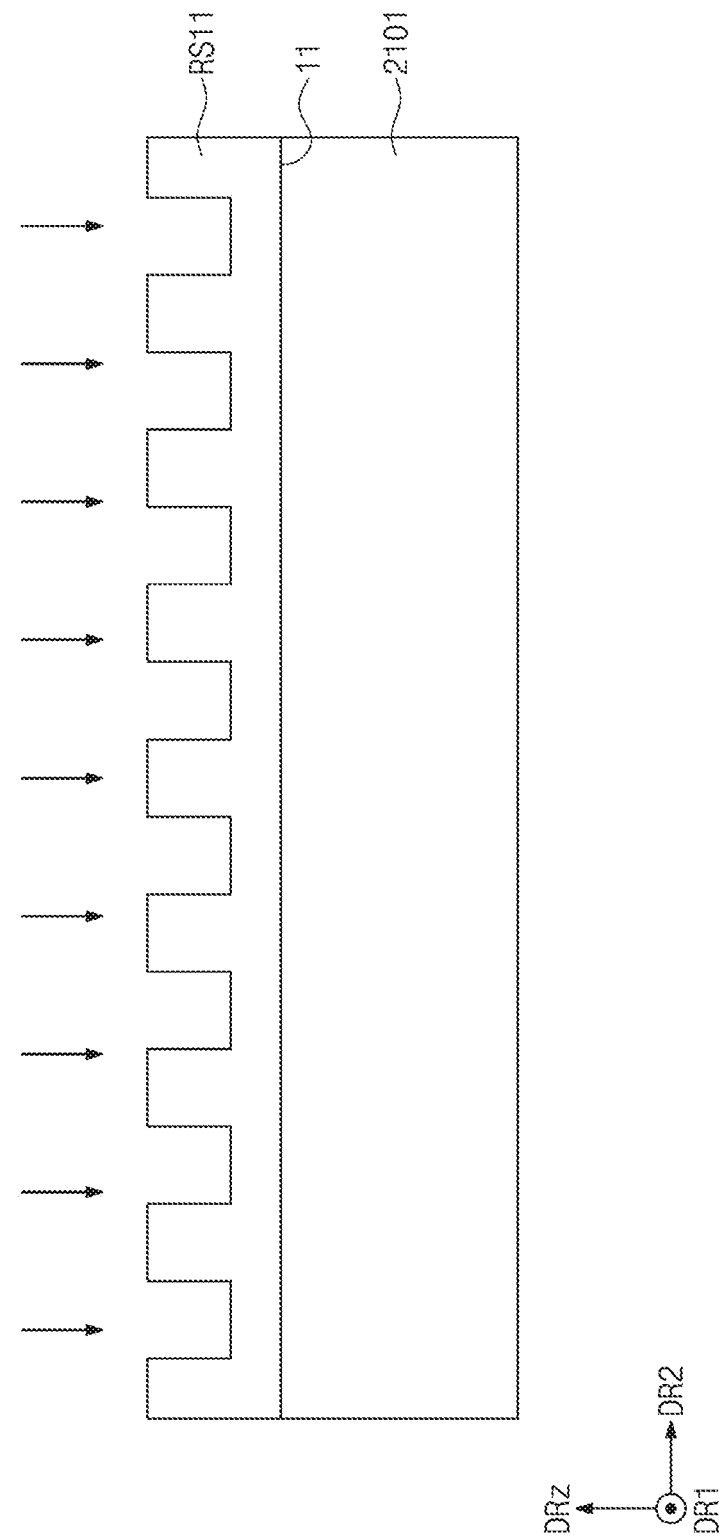
Figure 15D:
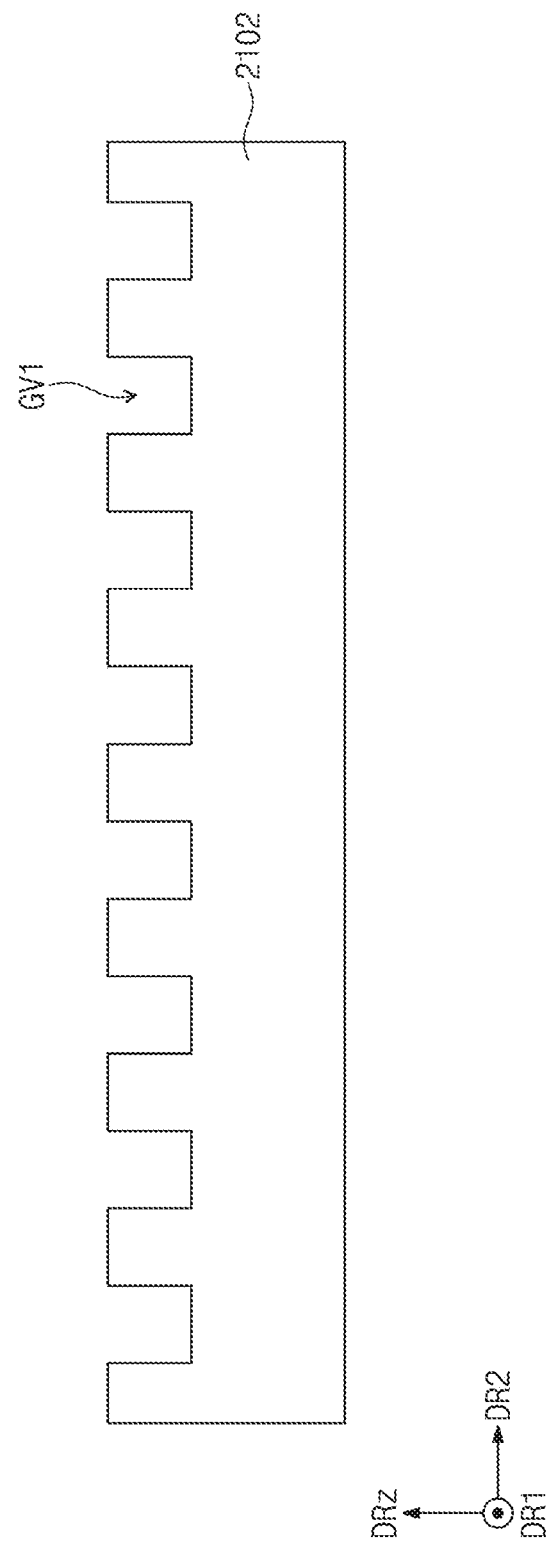

Referring to FIG. 15C, the substrate 2101 on which the patterned first resin RS11 is attached is etched. Referring to FIG. 15D, the first groove GV1 is formed in the first surface 11 of the substrate 2102 due to a difference in height between the concave portion and the convex portion of the patterned first resin RS11. A dry etch process may be used to allow an inclination angle of a side surface of the first groove GV1 to be about 90 degrees.

FIG. 16 is a cross-sectional view of a window member at a stage of forming polarization patterns according to one or more exemplary embodiments. Operation S22 will be described with reference to FIG. 16.

The polarization patterns PLN are formed in the first groove GV1. The polarization patterns PLN linearly polarize light incident thereto. Since details about the polarization patterns PLN are described above, a duplicative description will be omitted.

FIGS. 17A to 17D are cross-sectional views of a window member at various stages of forming a second groove according to one or more exemplary embodiments. Operation S23 will be described with reference to FIGS. 17A to 17D.

Figure 17A:
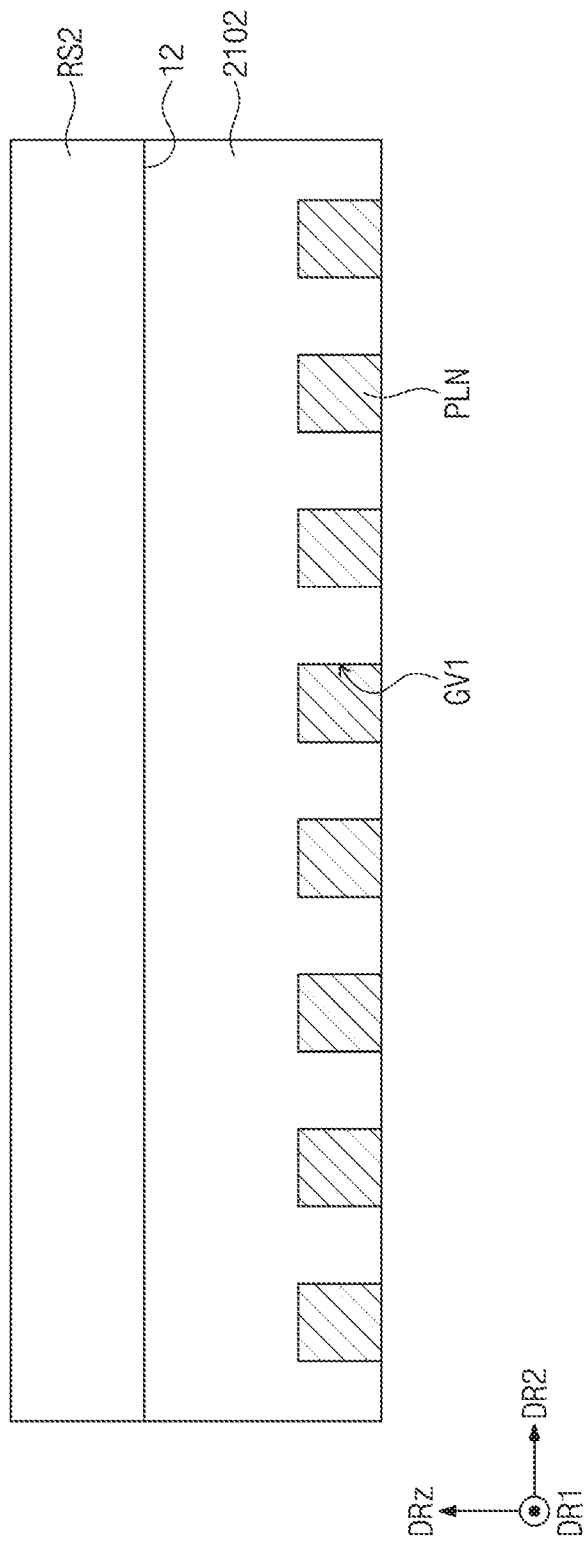
FIGS. 17A, 17B, 17C, and 17D are cross-sectional views of a window member at various stages of forming a second groove according to one or more exemplary embodiments.

Referring to FIG. 17A, a second resin RS2 is coated on the second surface 12 of the substrate 2102 including the polarization patterns PLN. The second surface 12 faces the first surface 11.

Figure 17B:
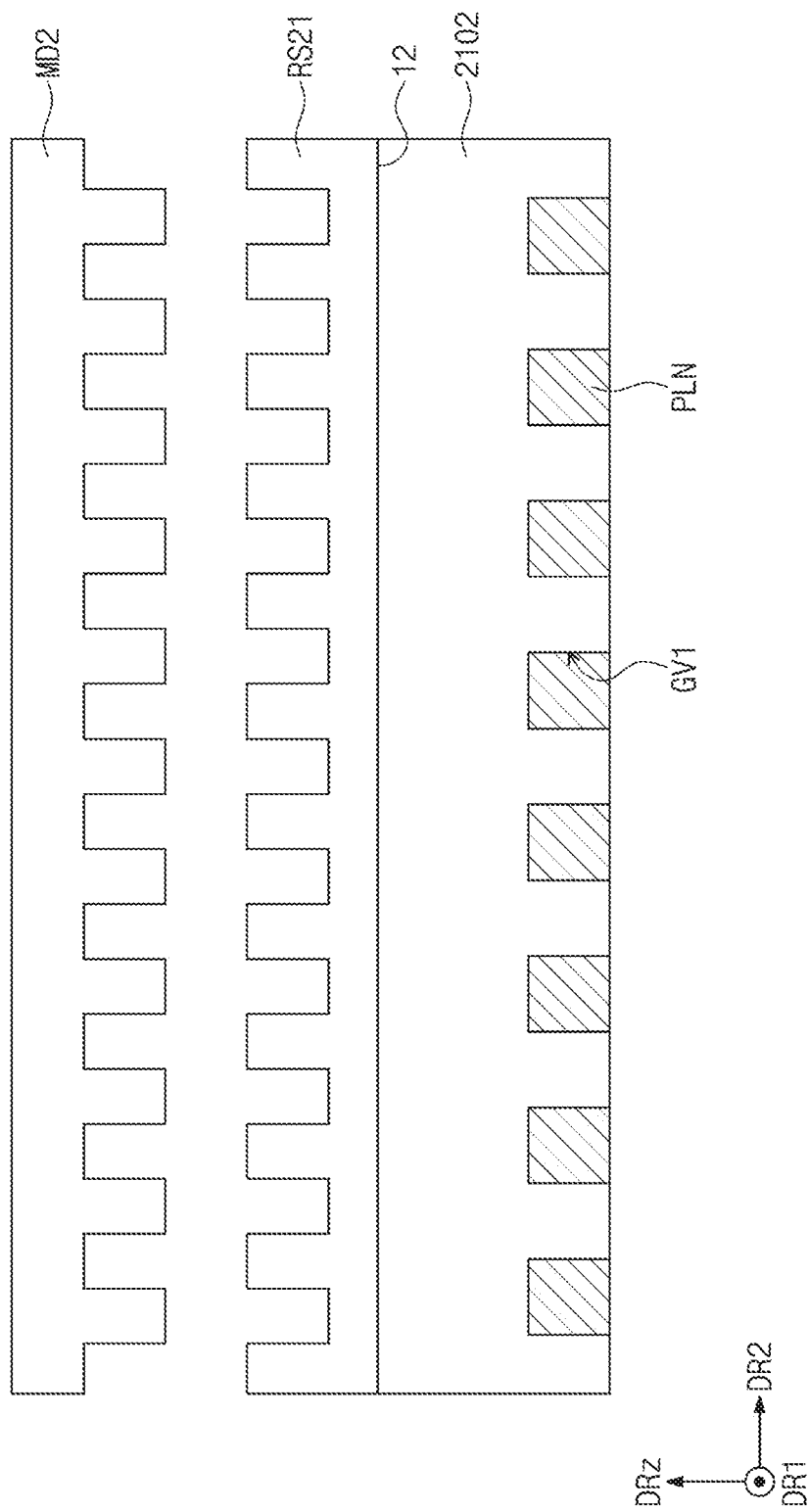

Referring to FIG. 17B, a second mold MD2 having a concave-convex portion formed on a surface thereof is prepared. The concave-convex portion of the second mold MD2 has a width greater than that of the first mold MD1. The second mold MD2 is disposed such that the concave-convex portion of the second mold MD2 faces the second resin RS2, and a patterned second resin RS21 is formed through an imprint process. The patterned second resin RS21 has a surface that is complementary to the concave-convex portion of the second mold MD2.

Figure 17C:
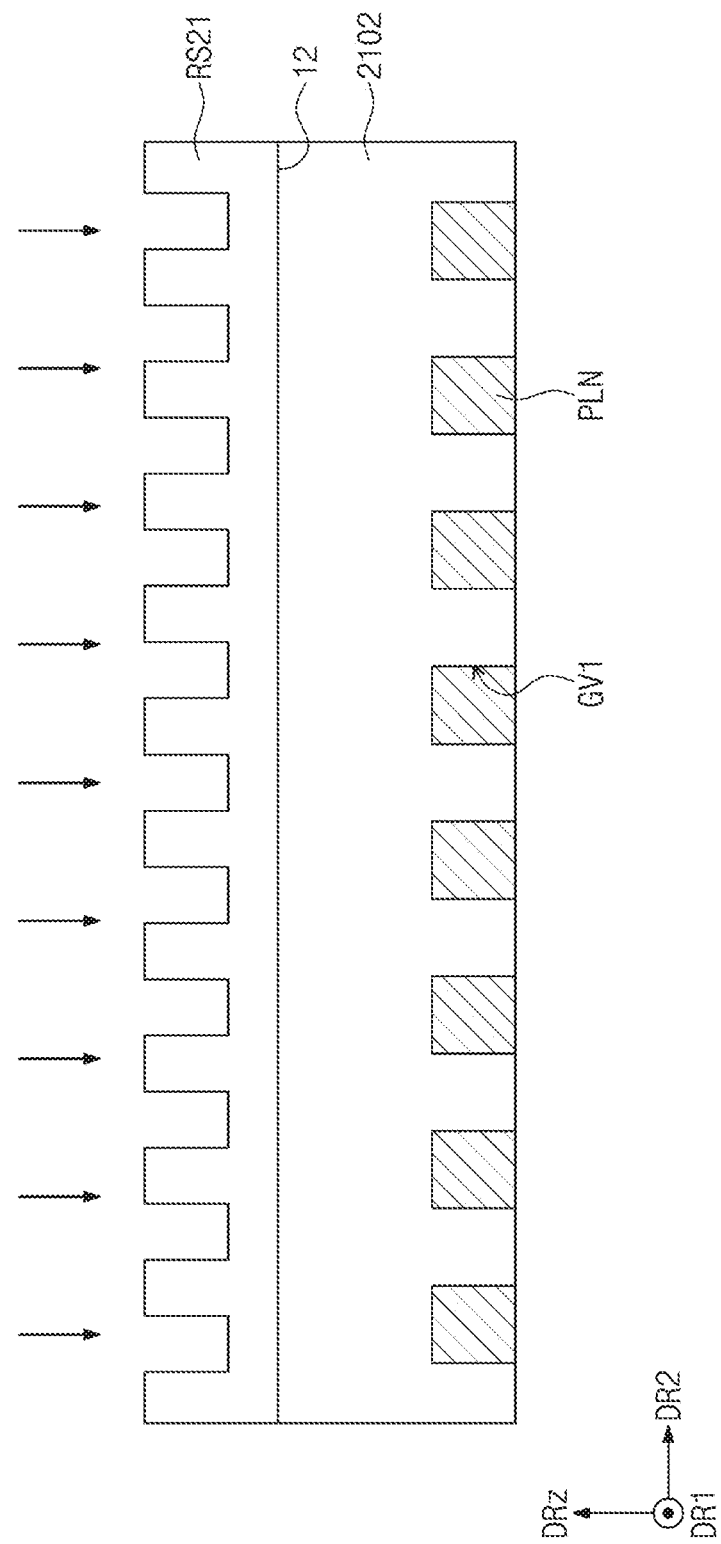
Figure 17D:
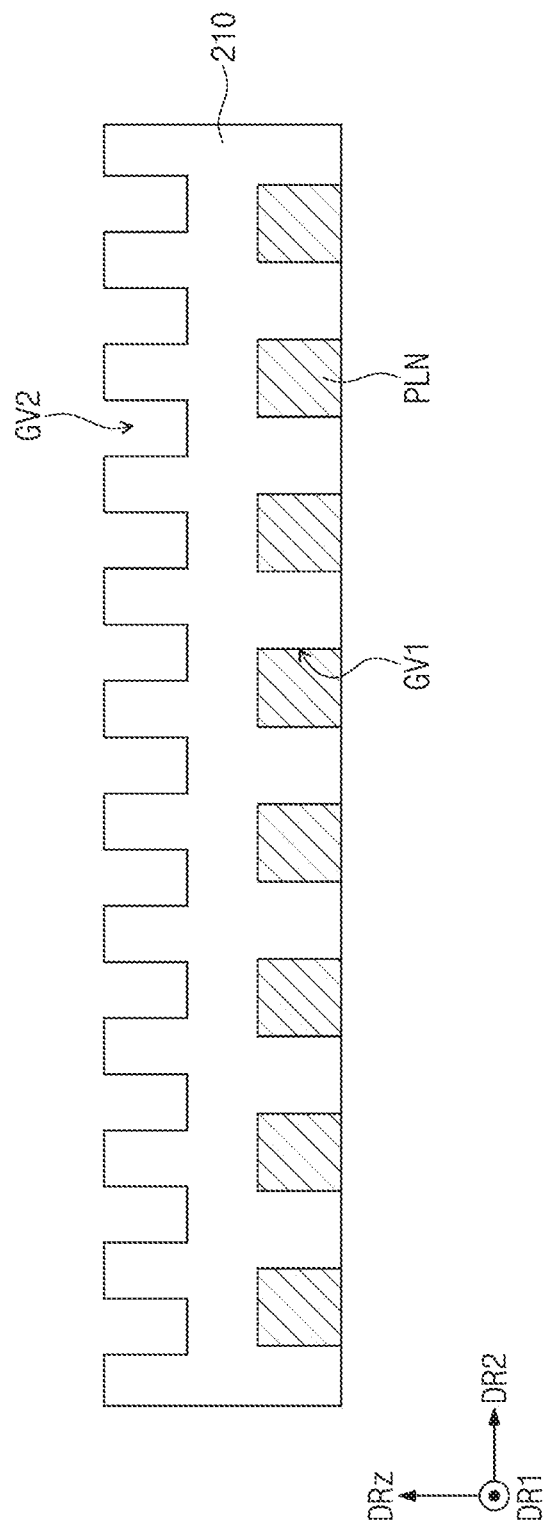

Referring to FIG. 17C, the substrate 2102 on which the patterned second resin RS21 is attached is etched. Referring to FIG. 17D, the second groove GV2 is formed in the second surface 12 of the substrate 2102 to form the window substrate 210 due to a difference in height between the concave portion and the convex portion of the patterned second resin RS21. A dry etch process may be used to allow an inclination angle of a side surface of the second groove GV2 to be about 90 degrees. The window substrate 210 having the first groove GV1 and the second groove GV2 is completed through the above processes shown in FIGS. 17A to 17D.

FIGS. 18A and 18B are cross-sectional views of a window member at various stages of forming touch patterns according to one or more exemplary embodiments.

Referring to FIG. 18A, the touch patterns TCN are formed in the second groove GV2. The touch patterns TCN are configured to sense a user's fingerprint. Since details about the touch patterns TCN are described above, a duplicative description will be omitted.

Referring to FIG. 18B, the filling agent FLN is formed on the touch patterns TCN in the second groove GV2. Since details about the filling agent FLN are described above, a duplicative description will be omitted. The window member 200 is completed through the above processes shown in FIGS. 18A and 18B.

Although certain exemplary embodiments and implementations have been described herein, other embodiments and modifications will be apparent from this description. Accordingly, the inventive concepts are not limited to such embodiments, but rather to the broader scope of the presented claims and various obvious modifications and equivalent arrangements.

What is claimed is:

1. A display apparatus comprising:
a display panel comprising pixels configured to display an image; and
a window member disposed on the display panel,
wherein the window member comprises:
a window substrate comprising:
a first surface comprising a first groove defined therein; and
a second surface facing the first surface, the second surface comprising a second groove defined therein;
polarization patterns configured to polarize incident light and disposed in the first groove; and
touch patterns disposed in the second groove, the touch patterns being configured to sense a pattern of ridges,
wherein a distance between the first surface and the second surface is greater than a sum of a depth of the first groove and a depth of the second groove,
wherein a height of the touch patterns is smaller than a height of the polarization patterns, and
wherein a touch sensing structure is disposed between the window member and the display panel.

2. The display apparatus of claim 1, wherein:
the height of the touch patterns is smaller than the depth of the second groove; and
the window member further comprises a filling agent disposed in the second groove to seal the touch patterns.

3. The display apparatus of claim 1, wherein, in the plan view, the polarization patterns extend in a first direction and are spaced apart from each other in a second direction crossing the first direction.

4. The display apparatus of claim 1, wherein the polarization patterns comprise:
at least one of a silver nanowire (AgNW), a carbon nanotube (CNT), and a graphene; or
at least one of aluminum (Al), chromium (Cr), gold (Au), silver (Ag), copper (Cu), nickel (Ni), iron (Fe), tungsten OM, cobalt (Co), and molybdenum (Mo).

5. The display apparatus of claim 1, wherein a width of each of the touch patterns and a distance between adjacent touch patterns of the touch patterns are greater than or equal to 5 μm and less than or equal to 100 μm.

6. The display apparatus of claim 1, wherein:
the second surface of the window substrate comprises convex portions protruded in an island shape, the convex portions being arranged in a matrix formation;
the second groove is defined between the convex portions; and
in the plan view, the convex portions respectively overlap the pixels.

7. The display apparatus of claim 1, wherein:
the touch patterns comprise:
first touch lines; and
second touch lines insulated from the first touch lines, the second touch lines crossing the first touch lines; and
a sum of a height of the first touch lines and a height of the second touch lines is smaller than a depth of the second groove.

8. The display apparatus of claim 1, wherein the first surface is further from the display panel than the second surface.

9. The display apparatus of claim 1, wherein the second surface is further from the display panel than the first surface.

10. The display apparatus of claim 1,
wherein:
the touch sensing structure is configured to sense a position of a touch interaction of an object with the display apparatus, a surface of the object comprising the pattern of ridges,
wherein:
the touch sensing structure comprises a plurality of electrodes configured to sense the position of the touch interaction; and
a size of a touch pattern among the touch patterns is smaller than a corresponding size of an electrode among the electrodes.

11. A display apparatus comprising:
a display panel comprising pixels configured to display an image;
a window member disposed on the display panel; and
a touch sensing structure disposed between the window member and the display panel,
wherein the window member comprises:
a window substrate comprising:
a first surface comprising first grooves defined therein; and
a second surface facing the first surface, the second surface comprising second grooves defined therein;
polarization patterns configured to polarize incident light and disposed in the first grooves;

first electrodes disposed in the second grooves, the first electrodes extending in a first direction; and second electrodes disposed on the second surface and the first electrodes, the second electrodes extending in a second direction crossing the first direction, the second electrodes being connected to and directly contacting the first electrodes, wherein the first electrodes and the second electrodes are touch electrodes configured to sense a pattern of ridges, wherein a height of the first electrodes is equivalent to a depth of the second groove, and wherein a portion of the second surface where the second groove is not defined and an upper surface of the first electrodes define a continuous plane, the second electrodes being disposed on the continuous plane.

12. The display apparatus of claim 11, wherein:
the second grooves extend in the first direction and are spaced apart from each other in the second direction.

13. The display apparatus of claim 11, wherein the polarization patterns comprise:
at least one of a silver nanowire (AgNW), a carbon nanotube (CNT), and a graphene; or
at least one of aluminum (Al), chromium (Cr), gold (Au), silver (Ag), copper (Cu), nickel (Ni), iron (Fe), tungsten OM, cobalt (Co), and molybdenum (Mo).

14. The display apparatus of claim 11, wherein:
a width of each of the first electrodes and a distance between adjacent first electrodes among the first electrodes are greater than or equal to 5 μm and less than or equal to 100 μm; and
a width of each of the second electrodes and a distance between adjacent second electrodes among the second electrodes are greater than or equal to 5 μm and less than or equal to 100 μm.

15. A method of manufacturing a display apparatus, comprising:
forming a display panel;
forming a window member;
forming a touch sensing structure between the window member and the display panel; and
attaching the window member to the display panel;
wherein forming the window member comprises:
forming a first groove having a first depth in a first surface of a window substrate;
forming polarization patterns configured to polarize incident light and having a first height in the first groove;
forming a second groove having a second depth in a second surface of the window substrate, the second surface facing the first surface;
forming a first touch pattern having a second height in the second groove, the first touch pattern extending in a first direction, the first touch pattern directly contacting a bottom surface of the second groove;
forming an insulating layer in the second groove and on the first touch pattern; and
forming a second touch pattern in the second groove such that the insulating layer is disposed between the second touch pattern and the first touch pattern, the second touch pattern extending in a second direction crossing the first direction,
wherein the first touch pattern and the second touch pattern are configured to sense a pattern of ridges,
wherein a distance between the first surface and the second surface is greater than a sum of the first depth and the second depth, and
wherein the second height is smaller than the first height.

16. The method of claim 15, wherein forming the first groove in the first surface of the window substrate comprises:
coating a first resin on the first surface of the window substrate;
patterning the first resin to form a patterned first resin, the patterned first resin comprising a concave-convex portion; and
etching the window substrate comprising the patterned first resin.

17. The method of claim 16, wherein etching the window substrate comprising the patterned first resin comprises a dry etch process.

18. The method of claim 15, wherein forming the second groove in the second surface of the window substrate comprises:
coating a second resin on the second surface of the window substrate;
patterning the second resin to form a patterned second resin, the patterned second resin comprising a concave-convex portion; and
etching the window substrate comprising the patterned second resin.

19. The method of claim 18, wherein etching the window substrate comprising the patterned second resin comprises a dry etch process.

* * * * *